US010684139B2

(12) United States Patent
Gluck

(10) Patent No.: US 10,684,139 B2
(45) Date of Patent: *Jun. 16, 2020

(54) NAVIGATION SYSTEM AND METHOD

(71) Applicant: Nytell Software LLC, Wilmington, DE (US)

(72) Inventor: Adrian Gluck, Beverly Hills, CA (US)

(73) Assignee: Nytell Software LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/372,241

(22) Filed: Apr. 1, 2019

(65) Prior Publication Data

US 2019/0226867 A1    Jul. 25, 2019

Related U.S. Application Data

(63) Continuation of application No. 15/669,129, filed on Aug. 4, 2017, now Pat. No. 10,247,569, which is a continuation of application No. 12/772,988, filed on May 3, 2010, now Pat. No. 9,726,513, which is a continuation-in-part of application No. 11/324,819, filed on Jan. 4, 2006, now Pat. No. 7,711,478.

(60) Provisional application No. 60/692,647, filed on Jun. 21, 2005.

(51) Int. Cl.
*G01C 21/36*     (2006.01)
*G01C 21/30*     (2006.01)

(52) U.S. Cl.
CPC .............................. *G01C 21/3667* (2013.01)

(58) Field of Classification Search
CPC ...................................................... G06F 19/00

USPC ......................................................... 701/409
See application file for complete search history.

(56) References Cited

U.S. PATENT DOCUMENTS 5,587,911 A    12/1996  Asano et al.
5,627,547 A     5/1997  Ramaswamy et al.
5,689,717 A    11/1997  Pritt
5,745,866 A     4/1998  Steiner
(Continued)

OTHER PUBLICATIONS

Agrawala, M., et al., "Rendering Effective Route Maps: Improving Usability Through Generalization," Siggraph 2001 Conference, Los Angeles, Aug. 12-17, 2001, <www.graphics.stanford.edu/papers/routemaps/>, 3 pages.

(Continued)

*Primary Examiner* — Tan Q Nguyen
(74) *Attorney, Agent, or Firm* — Christensen O'Connor Johnson Kindness PLLC

(57) ABSTRACT

A non-scaled, linearly compressed pictographic mapping system is provided for the visual display of information in a navigational aid. Unlike today's road maps which use a point-arc-polygon paradigm, the new mapping uses a non-scaled, linearly-compressed pictographic design that shows roads as linear pictograms. The display has a columnar layout, whereby the descriptive elements are grouped together by type, and displayed one above the other in columns. The maps may also contain icons representing points of interest. In this manner, the mapping paradigm also serves to increase traveler safety, provide navigation assistance during address-less trips, create valuable advertising space and new promotional opportunities, and dramatically increases the travelers' communications and entertainment options.

27 Claims, 30 Drawing Sheets

(56) References Cited

U.S. PATENT DOCUMENTS

| | | |
|---|---|---|
| 5,774,828 A | 6/1998 | Brunts et al. |
| 5,874,905 A | 2/1999 | Nanba et al. |
| 5,964,821 A | 10/1999 | Brunts et al. |
| 6,084,543 A | 7/2000 | Iizuka |
| 6,141,014 A | 10/2000 | Endo et al. |
| 6,154,219 A | 11/2000 | Wiley et al. |
| 6,178,380 B1 | 1/2001 | Millington |
| 6,249,740 B1 | 6/2001 | Ito et al. |
| 6,266,612 B1 | 7/2001 | Dussell et al. |
| 6,269,304 B1 | 7/2001 | Kaji et al. |
| 6,324,469 B1 | 11/2001 | Okude et al. |
| 6,346,942 B1 | 2/2002 | Endo et al. |
| 6,356,840 B2 | 3/2002 | Kusama |
| 6,359,571 B1 | 3/2002 | Endo et al. |
| 6,397,143 B1 | 5/2002 | Peschke |
| 6,405,129 B1 | 6/2002 | Yokota |
| 6,424,933 B1 | 7/2002 | Agrawala et al. |
| 6,484,094 B1 | 11/2002 | Wako |
| 6,510,386 B2 | 1/2003 | Sakashita |
| 6,529,822 B1 | 3/2003 | Millington et al. |
| 6,529,828 B1 | 3/2003 | Williams et al. |
| 6,565,610 B1 | 5/2003 | Wang et al. |
| 6,611,753 B1 | 8/2003 | Millington |
| 6,724,392 B1 | 4/2004 | Wiley et al. |
| 6,728,628 B2 | 4/2004 | Peterson |
| 6,760,027 B2 | 7/2004 | Endo et al. |
| 6,763,301 B2 | 7/2004 | McDonough |
| 6,810,327 B2 | 10/2004 | Akashi |
| 6,812,925 B1 | 11/2004 | Krishnan et al. |
| 6,825,855 B2 | 11/2004 | Maeda et al. |
| 6,826,472 B1 | 11/2004 | Kamei et al. |
| 6,836,781 B2 | 12/2004 | McDonough |
| 6,845,321 B1 | 1/2005 | Kerns |
| 6,850,837 B2 | 2/2005 | Paulauskas et al. |
| 6,853,912 B2 | 2/2005 | Han |
| 7,076,409 B2 | 7/2006 | Agrawala et al. |
| 7,076,505 B2 | 7/2006 | Campbell |
| 7,395,152 B2 * | 7/2008 | Watanabe ............ G01C 21/367 701/431 |
| 7,522,997 B2 * | 4/2009 | Asahara ............ G01C 21/3415 340/905 |
| 7,711,478 B2 | 5/2010 | Gluck |
| 8,990,101 B2 | 3/2015 | Nicosia |
| 2001/0034588 A1 | 10/2001 | Agrawals et al. |
| 2002/0075511 A1 | 6/2002 | Lorne |
| 2003/0125867 A1 | 7/2003 | Peterson |
| 2004/0027258 A1 | 2/2004 | Pechatnikov et al. |
| 2005/0033506 A1 | 2/2005 | Peterson |
| 2005/0149262 A1 * | 7/2005 | Oikubo ............... G01C 21/3658 701/431 |
| 2006/0074553 A1 * | 4/2006 | Foo ...................... G01C 21/367 701/431 |
| 2006/0149467 A1 | 7/2006 | Nakayama et al. |
| 2006/0267803 A1 | 11/2006 | Mathis et al. |
| 2007/0124068 A1 * | 5/2007 | Nakayama ......... G01C 21/3655 701/414 |

OTHER PUBLICATIONS

Agrawala, M., "Visualizing Route Maps," doctoral dissertation, Stanford University, Palo Alto, Calif., <www.graphics.stanford.edu/papers/maneesh_thesis/>, Jan. 2002, 2 pages (abstract).

Burkholder, E.F., "Viewing Spatial Data From the 3-D Perspective," New Mexico State University, Las Cruces, N.M., 6 pages (abstract).

Lobben, A.K., "Tasks, Strategies, and Cognitive Processes Associated With Navigational Map Reading: A Review Perspective," The Professional Geographer 56(2):270-281, May 2004.

Rowell, L., "Can We Map the Universe Pixel by Pixel and Make Money Doing It?," © 2004 Pearson Education, Inc., Apr. 2005, 5 pages.

* cited by examiner

S. LA BREA
STEP 3. KEEP GOING STRAIGHT ON S. LA BREA AVE.
STEP 4. TURN LEFT ONTO WILSHIRE AVE.

CONT'D PAGE 138

| Distance | PAGE | WEST | | PAGE |
|---|---|---|---|---|
| 5 MILES / 15 MINUTES | 112 | CANON | CANON | 115 |
| | 214 | CRESCENT | CRESCENT | 218 |
| | 36 | ELM | ELM | 38 |
| | 46 | REXFORD | REXFORD | 49 |
| | 202 | MAPLE | MAPLE | 204 |
| | 12 | PALM | PALM | 15 |
| | 98 | OAKHURST | OAKHURST | 101 |
| | 174 | DOHENT | DOHENT | 177 |
| | 302 | WETHERLY | ROSEWOOD | 304 |
| | 27 | ALMONT | ALMONT | 30 |
| | 33 | LA PEER | LA PEER | 36 |
| 4 MILES / 12 MINUTES | 282 | SWALL | SWALL | 285 |
| | 305 | CLARK | CLARK | 305 |
| | 23 | ROBERTSON | ROBERTSON | 23 |
| | 266 | ARNAZ | ARNAZ | 266 |
| | 91 | HAMEL | HAMEL | 91 |
| | 22 | WILLAMAN | WILLAMAN | 22 |
| | 24 | CARSON | CARSON | 24 |
| | 225 | STANLEY | STANLEY | 225 |
| | 322 | LE DOUX | LE DOUX | 321 |
| | 333 | LA CIENEGA | LA CIENEGA | 333 |
| | 200 | HAMILTON | HAMILTON | 200 |
| 3 MILES / 9 MINUTES | | GALE | GALE | |
| | 66 | TOWER | | 66 |
| | 93 | SAN VINCENTE | SAN VINCENTE | 93 |
| | 90 | SCHUMACHER | SCHUMACHER | 90 |
| | 12 | CAPSITRANO | CAPSITRANO | 12 |
| | | MCCARTHY | CRESCENT HEIGHTS | 357 |
| | 255 | SAN DIEGO WAY | | 255 |
| | 98 | FAIRFAX | FAIRTAX | 98 |
| 2 MILES / 6 MINUTES | 228 | ORANGE GROVE | ORANGE GROVE | 228 |
| | 401 | OGDEN | | 401 |
| | 248 | GENESEE | LA COUNTY | 248 |
| | 233 | SPAULDING | ART MUSEUM | 333 |
| | 238 | ALANDELE | | 238 |
| | 241 | STANLEY | LA BREA TAR PITS | 341 |
| | 39 | CURSON | CURSON | 39 |
| 1 MILE / 3 MINUTES | 45 | SIERRA BONITA | SIERRA BONITA | 44 |
| | 345 | MASSELIN | MASSELIN | 345 |
| | 378 | HAUSER | HADSER | 378 |
| | 55 | RIDGELEY | RIDGELEY | 55 |
| | 63 | BURNSIDE | BURNSIDE | 63 |
| | 202 | DUNSMUIR | POINSETTIA | 202 |
| | 199 | COCHRAN | COCHRAN | |
| | 331 | CLOVERDALE | CLOVERDALE | 331 |
| 0 MILES / 0 MINUTES | 340 | DETROIT | DETROIT | 340 |

WILSHIRE AVE.
CONT'D PAGE 224                    PAGE 225

NAVIGATION SYSTEM AND METHOD

CROSS-REFERENCE TO RELATED APPLICATIONS

This application is a continuation of U.S. application Ser. No. 15/669,129, filed Aug. 4, 2017, which is a continuation of U.S. patent application Ser. No. 12/772,988, filed May 3, 2010, now U.S. Pat. No. 9,726,513, which is a continuation-in-part of U.S. patent application Ser. No. 11/324,819, filed Jan. 4, 2006, now U.S. Pat. No. 7,711,478, which claims the benefit of U.S. Provisional Patent Application No. 60/692,647, filed Jun. 21, 2005, the disclosures of which are incorporated herein by reference in their entirety.

BACKGROUND OF THE INVENTION

The present invention relates generally to a method and system of providing an interactive navigational and mapping tool. More specifically, the present invention relates to a novel method and system for providing a linearly arranged visual display for the purpose of simplifying the navigation process, making it easier to stay on course, and reducing the incidence of getting lost.

The difficulty with nearly all mapping and navigational technology today is that the underlying assumptions used to generate the representation of the map are based on an antiquated navigational representation system. Principally, all of the available navigational aids rely on the well-known point-arc-polygon ("cartographic") representation. This point-arc-polygon paradigm, which is the underlying principle used by today's maps, is derived from the introduction of latitude by the Greeks around 225 B.C. and accurate longitude measurements in the seventeenth century. For geographers of that time period, the best graphic representation to depict areas on Earth was found to be a representation that was produced from the perspective of a bird several hundred feet up in the sky. This "bird's eye" view was then thought to be the most compact way of representing large areas in writing, and compact drawings were important at that time because maps were being drawn by hand on expensive materials. In this manner, the smaller the maps, the less manual labor and costly materials required for producing them.

Ultimately, because of the difficulty and cost associated with the production of maps, the principal purpose for maps was to represent land boundaries and other non-road related land features. Most importantly, land boundaries were critical because until fairly recently in terms of history, finding new land, clearing and planting it, and fighting for it preoccupied most everyone's time and energy. Roads, on the other hand, were few and far between and had little direct monetary value, other than the toll fees they generated for the owners of the land they passed through. Most people never traveled more than a few miles from their homes. Furthermore, at that time most roads were mere narrow dirt pathways. Rain, snow, slides, horses' hoofs, and cart wheels continuously damaged the roads, necessitating frequent redirecting and relocating. Consequently, maps were notoriously unreliable when it came to depicting roads. Therefore, in cartographic maps, because of the supreme importance originally accorded to non-road related land features and their boundaries, these features are clearly visible and highly detailed. Roads, on the other hand, are shown as thin lines that meander all over the place, their paths and directions dictated by the topography of the landmass they cross, and by the administrative jurisdictions controlling them.

Today, however, travelers are much more concerned with the roads they travel on than with the landmass they pass through. Since the advent of the automobile at the beginning of the 20th century, travelers have needed to know much more about the roads they travel, because navigating a 3,000-pound car at 65 miles an hour is highly dependent on road conditions and the interconnectivity of those roads. In this regard, travelers now want highly detailed information about the roads, including the number of lanes, grade, pavement quality, lane markings, lighting, speed limits, directions, and many other road-specific attributes. The difficulty is that relatively little has changed in the way that roads are represented on present day maps. Except for some types of travel, such as sightseeing, travelers are not generally concerned with the landmass situated between their start and destination points. They cannot afford to spend much time looking out the window or at information related to the landmass, lest they be late to where they are going, or worse, get into an accident.

Currently, the most commonly used navigational aids include pre-printed maps, map books, on-demand computer maps, compasses, and global positioning system (GPS) based navigational devices. Generally, all of these navigational aids are based on, or rely upon, information obtained from cartographic maps. The difficulty is that whenever geographic features and feature classes are represented on a communication medium, e.g. in print, on a computer display monitor, or on a TV set monitor, geometric generalization necessarily takes place. As a result of the limiting aspects of cartographic representation, a large amount of generalization must be performed in order to make a displayed map readable. The need for generalization, such as for example, the simplification of the shapes of displayed figures, exaggeration of a figure's size, displacement of a figure relative to its actual location, and removal of a figure altogether introduce additional limitations to cartographic representation. These generalizations result in increasing the level of graphic abstraction relative to the original surveyed form of the geographic features and feature classes described. This problem becomes further amplified when a low-resolution display device is utilized to display and print maps.

Each particular form of navigational aid from the prior art has its own unique drawbacks. For example, while pre-printed maps, such as the one depicted in FIG. 1, are widely available and can be purchased in retail outlets or via the Internet, these maps use the conventional cartographic method of visual presentation (see FIG. 1). Some newer style maps try to create a sense of perspective. However, while these perspective-style maps are more attractive than their non-perspective counterparts, this style of representation is not necessarily better for navigating because the images depicted still do not represent the typical images travelers see when navigating in real life. Unless they are at the top of a hill, travelers see things from eye-level, with no long-view perspective. Accordingly, these perspective-enhanced maps (often referred to as "3-D") do not offer a significant cognitive improvement.

Generally, today's pre-printed maps present a series of problems. Regardless of the current direction of travel, pre-printed maps are oriented to show North at the top, thus making it difficult to get orientated when traveling in any direction other than a Northerly direction. When these maps are rotated to match the user's actual heading, their labels end up upside down, at an angle, or sideways, making the labels difficult to read, especially since typically they are shown in small fonts. Further, the conventional maps are typically large in size and made of thin paper, and thus are difficult to hold while walking, driving, or while outdoors in inclement weather. Their large size also requires that they be folded or rolled when not in use. Their small print and the multitude of text, lines, symbols and graphics all crowded together makes them difficult to read and understand, especially by people with bad eyesight. They are also hard to orient in the direction of travel without a compass, a task that is particularly difficult for untrained users. Retail outlets may not carry the latest version of maps that cover regions beyond the local area of the retail outlet, a problem that is not readily apparent to the buyers. Finally, users may need several such maps to cover a single trip.

Similar in nature to pre-printed maps, map books such as the Thomas Guides™ and Thomas Bros. Road Atlases™ are pre-printed collections of related maps in bound book form (Thomas Guides and Thomas Bros. Road Atlases are trademarks of Rand McNally Company). They attempt to get around some of the handling problems of single sheet pre-printed maps by segmenting large geographic areas into smaller areas and placing them onto separate pages. While this makes the individual maps easier to handle, map books introduce their own problems. Most importantly, it is difficult to follow a planned travel route that spans several pages within the book. This requires the user to follow one portion of a road on one page to another portion of the same road on another page where the respective pages in the map books are not necessarily adjacent to each other. In addition, map books can be rather heavy and cumbersome to hold while looking for the right map. Finally, map books are rather expensive, typically costing between $30 and $40 each and can be difficult to find in stores located outside of the geographic areas covered by their maps.

Another navigational aid used in the prior art is the compass. Compasses consist of a thin piece of magnetic material that is free to rotate on a pivot mounted in a compass case. The North-seeking pole on the magnetic material is indicated and the points of the compass are marked to indicate North, South, East and West. Similarly, digital compasses have been introduced which display the compass points and the direction of travel digitally. Since compasses on their own do not give the user enough information to travel from one point to another, a traveler must use a compass in conjunction with a map, wherein such usage requires some level of training and practice. Further, because compasses are magnetic devices, their accuracy can be severely affected by proximity to ferrous metals and by physical location. In most cases, an initial calibration is needed if a compass is installed inside a vehicle or boat.

In response to the bulky and cumbersome nature of printed forms of maps, computer maps that are printed or displayed using computer devices are increasingly used for navigation purposes. However, computer maps also have several problems. FIG. 2 for example is a conventional map of a complete trip produced using the service available at www.mappoint.com and FIG. 3 is a "LineDrive" format map of the same trip as depicted in FIG. 2 produced using the service available at www.mappoint.com. (Mappoint and LineDrive are trademarks of Microsoft Corporation).

The primary problem with today's computer maps is their low-resolution. Currently, computer displays typically have resolutions in pixels of 800×600, 1024×768 and 1280×1024, with typical monitor sizes of 15", 17" and 19". When displaying a map formed from a large array of pixels on a computer monitor, many of the features and text may become illegible or disappear entirely. Since there is a wide variety of monitor sizes and resolutions, and the variation in resolution between devices could be as high as a factor of 5, computer maps designers have created conceptual and semantic generalizations to display certain features. Principally, digital map designers have made decisions to omit entire feature classes, reclassify features into different or new feature classes, and represent features and feature classes using symbols and icons. As a result, most computer generated cartographic maps are difficult, if not impossible, to read and use effectively when displayed on the monitors of small form devices such as palmtop computers, personal digital assistants (PDAs), GPS-based systems, and mobile telephones.

The next advance in computerized mapping is computerized mapping with an active GPS locator. GPS-based systems provide a user with 24-hour three-dimensional position, velocity and time information to identify the user's exact location on or near the surface of the Earth. The signal data is then used in conjunction with a digital map that is held resident in the user's device to place a representation of the user's position on a cartographic map. There are currently three satellite navigation systems operational, or soon-to-be operational, GPS (U.S. operated), GLONASS (Russian-operated), and GALILEO (European-operated). In addition, Wireless Assisted GPS systems (A-GPS) such as those available from SnapTrak, Inc, use a hybrid of satellite and terrestrial signals, which enables them to operate more effectively than unassisted GPS in environments such as indoors, and high-rise urban areas.

GPS-based systems are used in a wide range of directional, tracking, and monitoring applications on land, water and in the air and they are becoming increasingly popular, especially in vehicles and for wilderness trekking. When given exact starting and ending locations for a trip, GPS-based systems with route-guidance capabilities can provide turn-by-turn travel directions, visually and/or by voice. GPS-based systems display the current position on a map that moves in translation and rotation as the user moves, or as a fixed North-up map on which an indicator moves to indicate the current position. As with all of the previously discussed navigational systems, GPS-based systems also have a number of problems associated with them. Since GPS-based devices contain several electronic and mechanical components, extensive software, and very large databases depicting cartographic map representations that require constant updating in the field, these systems typically cost over $500 (in 2005). Due to space constraints, most of the installed displays are up to twenty times smaller than typical computer monitors, making it difficult to show any information other than the most basic, omitting much of the information critical for navigating, such as most of the roads. This problem is compounded by the fact that the resolution of the displays is relatively low, making it practically impossible to read small text and graphics from the driver's seat, while maintaining a safe driving position. Accordingly, unless the GPS-based device provides audible voice turn-by-turn instructions, GPS-based systems are of limited help while engaged in other attention-intensive activities such as driving. For this reason, new regulations require that vehicles be in a parked position in order to access certain of the systems' functions such as setting a new destination address.

Further limiting the usefulness of GPS-based navigation is the fact that some information is inaccurate due to the delay between the time the data is captured in the field and the time it is updated on the users' display. Often, this is coupled with the fact that the images displayed on the screen move with a somewhat jerky motion because of the time it takes to populate each screen with the intensive graphics displayed by cartographic maps and because the display is refreshed every second or so. In addition, information about intervening intersections and surrounding areas around the programmed route is typically left out or is not available. Accordingly, the turn-by-turn directions address only the transition points i.e. points that require decisions to be made in order to stay on the original course. The user is thus kept uninformed regarding any information that is relevant in between the transition points for periods sometimes lasting tens of intersections and tens of miles. This creates anxiety for the user and is a major cause of cognitive overload.

Finally, GPS systems do not provide much assistance for users that are not traveling to a precisely-defined destination or address. Little, if any, assistance is provided for such "address-less" travel, such as way-finding when lost, traveling in familiar areas, cruising about, or sightseeing.

Ultimately, the problem with all of these maps and devices is grounded in the cartographic representation that they utilize to define spatial relationships for the user. In each case, the chosen user interface makes it difficult for the user to employ the navigational aid in a manner that is truly helpful. Psychologists have found that people's perception of space is experience-based. The human brain is wired such that people must experience space in person in order to fully understand it. This experience-based view is in direct contrast to the abstract way in which space is described by cartographic maps, (Newtonian space containing Euclidian objects). Maps use abstract mental constructs, such as points, lines and polygons (Euclidian objects), which cannot be experienced through the human senses. The points, arcs, and polygons of cartographic maps have no counterparts in the real world, and thus, most people have difficulty reading maps because they simply cannot imagine in their mind's eye something that they have not personally experienced. This causes the human brain to fight and block the cartographic maps' attempts to represent space. Merely looking at a map does not substitute for the direct and personal experience humans need in order to understand space.

Reducing or totally eliminating this dichotomy between the manner in which people actually perceive space and the way in which cartographic maps represent space has not been a priority in the world of cartography. Cartographers have not consulted with specialists in ergonomics or experts in mass-media communications to assist them in confronting and resolving problems of human perception when attempting to understand and utilize cartographic representations. Marshall McLuhan, arguably the father of mass-media communication science, stated that "the medium is the message", i.e. messages take much of their meaning from the means by which they are delivered to the readers, listeners, and viewers. Thus, a clue to solving the dichotomy between how people perceive space and how cartographic maps describe it is to replace such maps with representations that evoke spaces that people have actually experienced.

Due to the general unfamiliarity and discomfort most users have with the spatial representations that are used in cartographic maps, reading and interpreting such maps requires a great deal of mental and sensory activity. A user must use scales to convert distances and areas, they must rotate images, they must read very small letters, symbols and numbers, and they must be able to track thin lines that weave in and out, all of which is made more difficult because the text and graphics (e.g. points, arcs, polygons, logos, icons) are usually densely packed together into small areas. Furthermore, some navigation systems use perspective geometry to depict roads and exit lanes as if viewed from an angle from above and narrowing in the distance. The perspective images generated may not be familiar to users, as they do not represent the actual images they see when they are within sight of roads or exit lanes in real life. All of these activities take away time and attention from the main tasks of traveling, such as driving, riding, running, walking, and sightseeing.

Cognitive load research has shown that short-term memory is limited in the number of elements it can contain simultaneously. As a result, in the presence of any distractions, task performance that depends on the use of short-term memory quickly starts to decay. The price of the high cognitive load associated with reading and interpreting maps is that the great majority of people have difficulty using maps, especially while performing other tasks. The newer computer-based navigation systems, whether GPS-based, standalone computer-based, or Internet-based, alleviate some of the cognitive overload problems, however, they introduce new ones, such as low resolution displays and printers, and performing new tasks necessary to operate the systems themselves. Because of the built-in cognitive overload of these systems, many information and entertainment products and services are impractical to use in conjunction with them. Thus, major commercial opportunities are missed, technological synergy is squandered, and users continue to have navigation difficulties. Accordingly, minimizing the short-term memory requirements and reducing the overall cognitive load are essential for creating usable maps and navigation systems. Whereas viewing landmass through a bird's eye view from hundreds or thousands of feet above is satisfactory for that purpose, to clearly see the roads and to know all that matters about them requires a much different view.

In addition to consuming a large amount of short-term recall capacity, most navigational aids base their instructions to users on numerical information such as distance and time. This presents a series of problems. First, it requires keeping an accurate count of the distances traveled and the time passed for each stage of a trip. Second, since distances are hard to measure on maps, the numbers used may be inaccurate. Third, some people travel faster and others travel slower. Finally, numeric reckoning is only satisfactory for about half of the general population. It is estimated that the general population is evenly divided between left-brain and right-brain thinkers. Numeric reckoning is a left-brain activity and thus it is not a satisfactory communication method for right-brain thinkers. Right-brain thinkers prefer landmark-based reckoning because it is picture-based and visual, rather than data-based and auditory (NOTE: text is an auditory form of communication as it is a symbolic representation of sounded words). Right brain thinkers cannot effectively visualize how long a distance is, or estimate how long it takes to travel that distance. One of the easiest ways to navigate is to match real life landmarks (e.g. intersections, points of interest, signs, or any other visible thing, place, structure, or marking) with their respective representations on a map and/or directions given. Unfortunately, this is not an easy feat to accomplish using today's navigational aids, given the typically small size of their maps' text and graphics, and the paucity of landmarks shown.

To get such a view, we need to get much closer to the roads' surfaces, we need to analyze and record the roads' relevant attributes, and we must do this from every possible direction of travel and point of view. We need to depict everything that matters about the roads in a way that is quick and easy to read, and clear and unambiguous to understand. Most importantly, we must do it in a way that does not detract from the travelers' enjoyment, or distract them from safely performing other travel-related tasks, whether they are driving, riding, running, walking, listening to music, or talking on the cell phone.

Accordingly, there is a need for a new navigational aid that provides a representational display that is modernized as compared to cartographic map representations. There is a further need for a navigational aid that uses a different cartographic paradigm in that the display devotes more visual space to roads than to landmass while utilizing experiential rather than abstract representations of space. There is yet a further need for a navigational aid that takes into consideration the human factors in engineering and that reduces the cognitive load experienced by users, while also including more pictures in order to assist "right-brain dominant" users. Finally, there is a need for a navigational aid that satisfies the needs of "address-less" travel.

BRIEF SUMMARY OF THE INVENTION

In this regard, the present invention provides for a novel navigational aid that is based on a new modular linear-pictographic-topological mapping paradigm. In this manner, the present invention provides a system and method wherein the roads being traveled are depicted as non-scaled, compressed linear representations that overcome most of the above-identified problems encountered in prior art navigational aids.

In one embodiment of the present invention, the display depicts roads linearly (i.e. in a straight line), without any curves or turns rather than showing roads as thin squiggly lines meandering around and through landmass, as was the case in the prior art. This graphic representation serves to reduce the cognitive load on users by eliminating the need to do mental image rotations and also serves to reduce eyestrain and fatigue.

In another embodiment, the present invention utilizes vertically oriented linear pictograms to depict roads. The pictograms bring a sense of familiarity by simulating images of actual roads. This method also serves to reduce the users' cognitive load as well as create additional visual space, which can be used for new applications as will be described in detail below.

In yet a further embodiment of the present invention the road information is depicted in a relational, unscaled manner rather than in the traditional geographic manner. In other words, the information in the display is presented in a manner that compresses the distances between intersecting roads so that many more intersections can be represented all at once, in an easily readable image.

In order to make it easier for a user to find relevant information, maps made according to the preferred embodiments of the present invention use a columnar layout, whereby the descriptive elements are grouped together by type, and displayed one above the other in columns symmetrically disposed to the right and left of the vertically oriented linear representations of the current roads.

In addition to providing a navigational aid that is easier to read, manipulate and understand, the method and system of the present invention also serves to free up as much as 80% of the visual space on the display that was traditionally used by prior art cartographic maps for depicting landmass and the twists and turns of roads. In this manner, the freed-up space can be used to enhance the readability of the maps, increase the geographic area that can be seen in a single map, enable the delivery of more information, and facilitate the integration of new capabilities into the navigational aids, such as advertising, personal communications and entertainment. Further, many different types of special purpose maps can be created using the present invention, such as tourist area maps, shopping area maps, real estate maps, demographics maps, and economics maps.

Other benefits of the method and system of the present invention include the use of a high-level of human-factors engineering wherein the navigational aid uses the optimum mix of factors such as orientation, layout, perspective, scale, text size, graphics, and other factors affecting human brain processing and perception. Also, elements that the method and system incorporates provide the user with assistance for address-less travel, that is, travel to a location without a specific ending address. Finally, the navigational aids of the present invention are simpler and less expensive to manufacture than prior art navigational aids, thus making them more affordable.

Accordingly, it is an object of the present invention to provide a navigational aid wherein navigational information is depicted using linear representations. It is a further object of the present invention to provide a navigational aid that displays the necessary route information in a linear pictogram showing the primary road on which the user is traveling and all of the required route information as graphic representations. It is yet a further object of the present invention to provide a navigational aid that displays the necessary navigational information in a manner that reduces the overall space required for such a display and thus reduces the amount of information that must be processed by the user in order to understand the presentation.

These together with other objects of the invention, along with various features of novelty, which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

In the drawings which illustrate the best mode presently contemplated for carrying out the present invention:

FIG. 19 shows a typical page of a map book made according to the present invention;

FIG. 20 shows a page of a map book made according to the present invention, which is a continuation of the map on the page in FIG. 19;

DETAILED DESCRIPTION OF THE INVENTION

Figure 1:
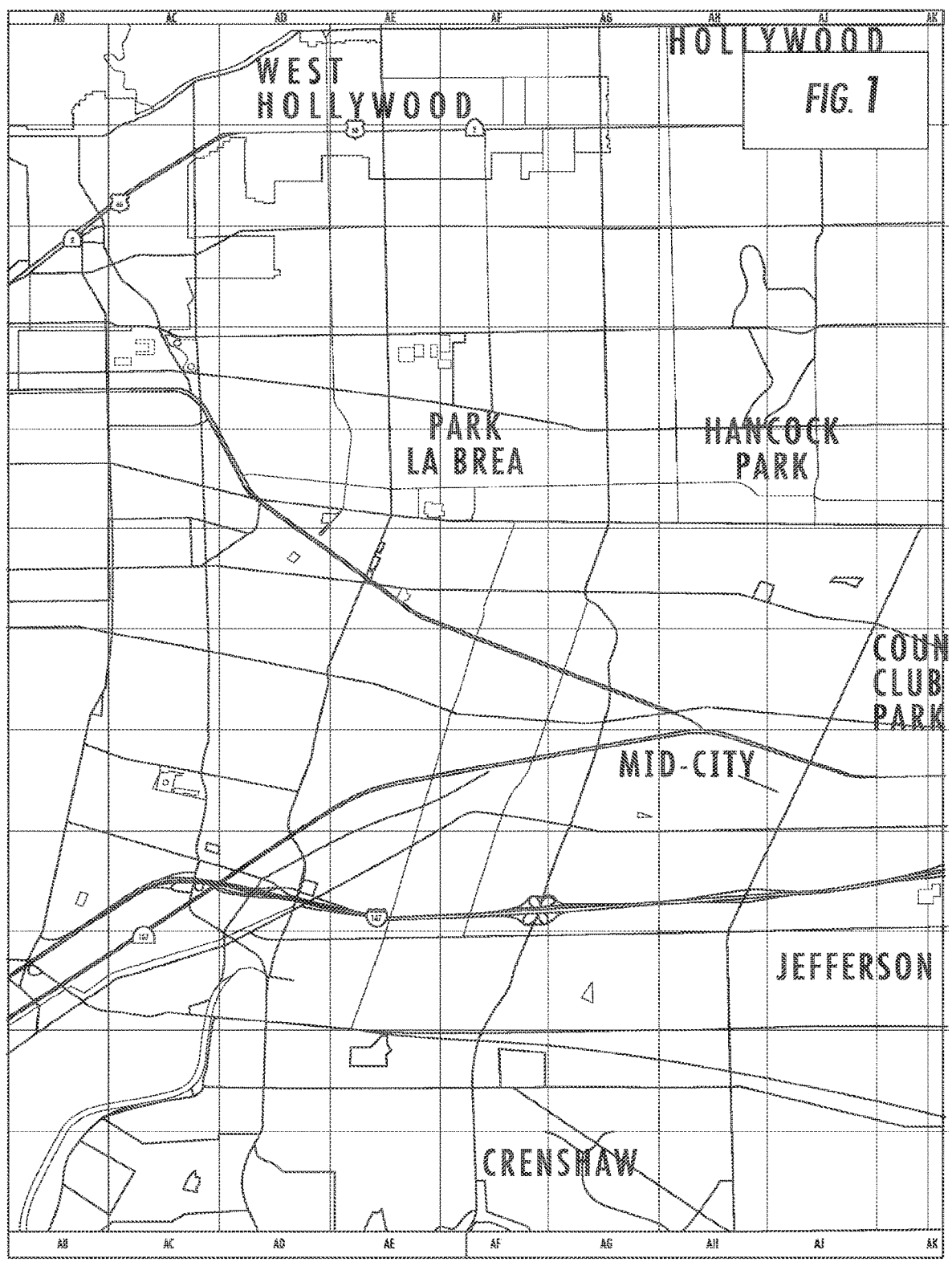
FIG. 1 is a typical conventional paper cartographic map of an area of Los Angeles, Calif., including a portion of S. La Brea Blvd.

The present invention provides a novel system and method that is directed to assisting users with point-to-point navigation or for the purpose of planning trips in advance. The benefits of the system and method of the present invention include an improvement in safety and a reduction in cognitive distraction that is typically associated with using a navigational device. The system and method of the present invention also assists users with "address-less" travel, such as navigating with little, incorrect, or no destination information or way finding when lost.

In this regard, the following definitions are provided for the purpose of the disclosure of the present invention.

"Arc" is defined by The American Heritage® Stedman's Medical Dictionary Copyright© 2002, 2001, 1995 by Houghton Mifflin Company as "a curved line or segment of a circle."

"Bird's eye view" for the purposes of the present invention is defined as "a panoramic view of the ground such as a bird might see from hundreds or thousands of feet high above the ground."

"Cartographic map" for the purposes of the present invention is defined as "a map that uses the point-arc-polygon method of visual presentation."

"Cartography" for the purposes of the present invention is defined as "the method of visually representing areas on the Earth's surface using points, arcs, and polygons."

"Clip art" is defined by The American Heritage® Dictionary of the English Language, Fourth Edition as "ready-made pieces of printed or computerized graphic art, such as illustrations, borders, and backgrounds, that can be electronically copied and used to decorate a document."

"Current road segment" for the purposes of the present invention is defined as "the main road segment being featured in a display and/or on a printed page."

"Ergonomics" is defined by The Free On-line Dictionary of Computing, © 1993-2005 Denis Howe as "the study of the design and arrangement of equipment so that people will interact with the equipment in healthy, comfortable, and efficient manner. As related to computer equipment, ergonomics is concerned with such factors as the physical design of the keyboard, display monitors, and related hardware, and the manner in which people interact with these hardware devices."

"Geocaching" is defined by Webster's New Millennium™ Dictionary of English, Preview Edition (v 0.9.6) Copyright© 2003-2005 Lexico Publishing Group, LLC as "a type of scavenger hunt for waterproof containers bearing treasure using the containers' exact geographic coordinates and Global Positioning System devices."

"GPS" for the purposes of the present invention is defined as "all global navigation satellite services, including GPS, A-GPS and other earth-based and satellite-based automated location and positioning technologies."

"Hovering view" for the purposes of the present invention is defined as "the view of a place on the ground that someone would see if hovering directly above that place on the ground. The view has no perspective, unlike the "bird's eye view."

"Input", "request", "select", "choose" for the purposes of the present invention are defined as "an action that involves the use of one or more of the devices and methods typically used by people in order to communicate with computing devices, including tapping a keyboard key, moving a pointing device, gliding a finger on a touch-pad, pressing a button, sliding a lever, tapping a touch-screen display monitor, moving a yoke, using a joystick, speaking into a microphone, etc."

"Intersection" for the purposes of the present invention is defined as "a point where three or more path segments meet."

"Landmark" for the purposes of the present invention is defined as "a physical reference point such as an object of note, building, mountain, tower, store."

"Landmass" for the purposes of the present invention is defined as "any land area that is not used for roads or landmarks."

"Linear pictogram" for the purposes of the present invention is defined as "a pictogram whose picture is a linear image of a road, transformed to show the road in a straightened-out fashion, i.e. all curves and turns in the road have been removed."

"Location Based Services" (LBS) for the purposes of the present invention is defined as "services provided to a user based on the automatic determination of the geographic location of the user's wireless device."

"Mapcast" is a new term created specifically for the present invention, defined as "transmitting the location and related information to users of the present invention."

"Paradigm" is defined by The American Heritage® Dictionary of the English Language, Fourth Edition Copyright© 2000 by Houghton Mifflin Company as "a set of assumptions, concepts, values, and practices that constitutes a way of viewing reality for the community that shares them, especially in an intellectual discipline."

"Pictogram" is defined by The American Heritage® Dictionary of the English Language, Fourth Edition as "a picture representing a word or idea."

"Polygon" is defined by The American Heritage® Dictionary of the English Language, Fourth Edition, Copyright© 2000 by Houghton Mifflin Company as "a closed plane figure bounded by three or more line segments."

"Reckoning" (also referred to as "taking a fix") for the purposes of the present invention is defined as "a method of used by a traveler to estimate the current position without assistance from a GPS-based device, by comparing landmarks visible in real life with the landmarks shown on a map or listed/described on direction instructions."

"Road" for the purposes of the present invention is defined as "a pathway used for driving or riding a vehicle, running, walking, strolling, hiking."

"Road segment" for the purposes of the present invention is defined as "a portion or the entirety of a road", where "road" is defined as above.

"Shown", "indicated", "played", "rendered", "represented", "sent" and "transmitted" when used in connection to an output from the present invention, are defined for the purposes of the present invention as "one or more actions that involve the use of one or more of the devices and/or methods typically used by electronic devices and computers in order to communicate with people and/or other devices, including displaying images and/or text on computer display monitors, printing images and/or text on printers, playing audio messages, and sending electronic signals to other devices."

"System" for the purposes of the present invention is defined as "software and/or hardware and/or services, separate or in combination operating according to the needs of the present invention."

"Topological map" for the purposes of the present invention is defined as "a combinatorial structure without geometric information".

Figure 2:
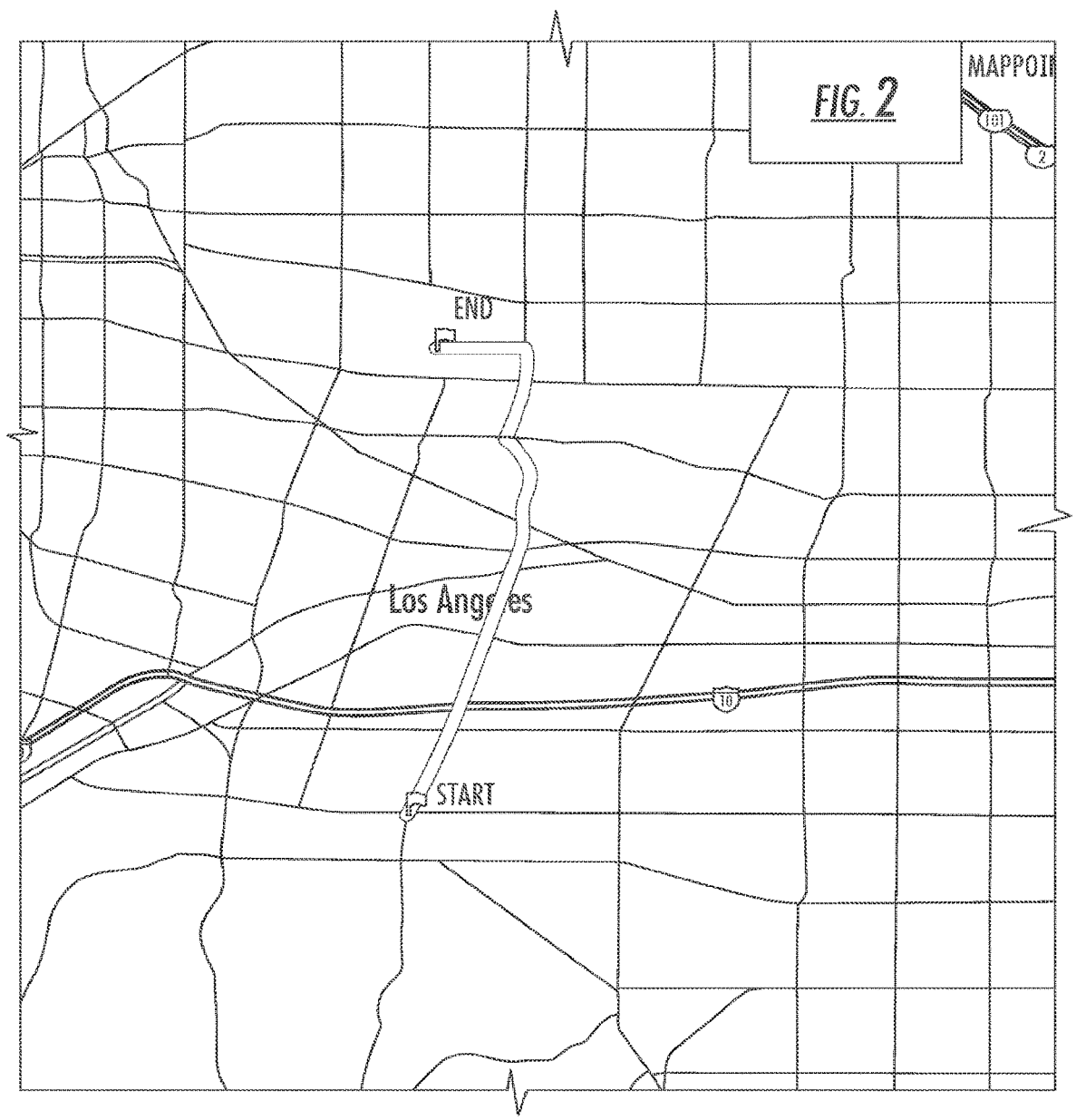
FIG. 2 is a conventional map of a complete trip produced using the service available at www.mappoint.com.
Figure 3:
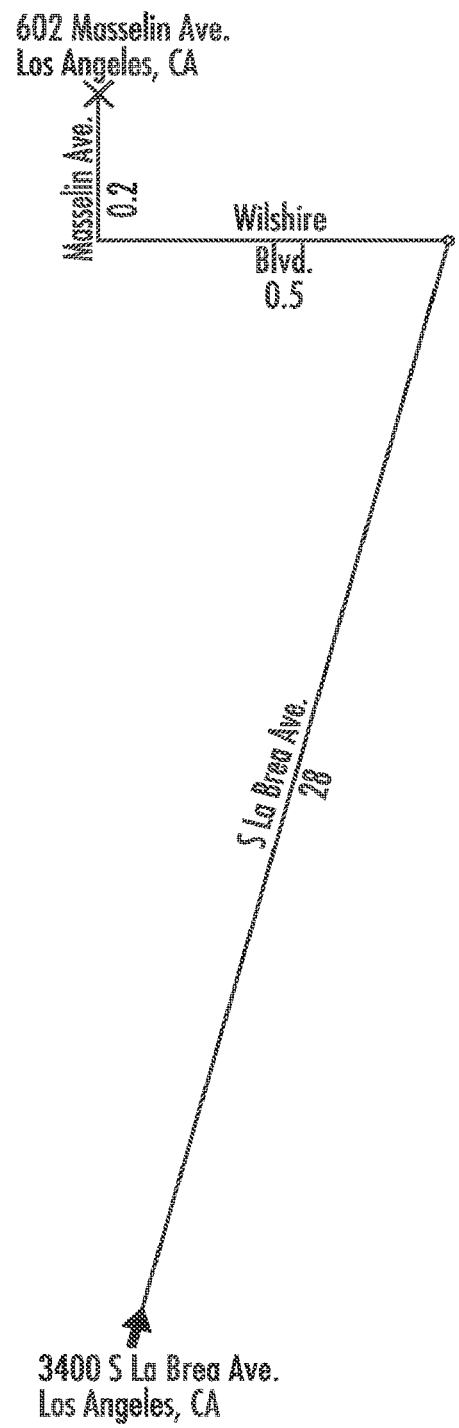
FIG. 3 is a "LineDrive" format map of the same trip as depicted in FIG. 2 produced using the service available at www.mappoint.com.
Figure 4:
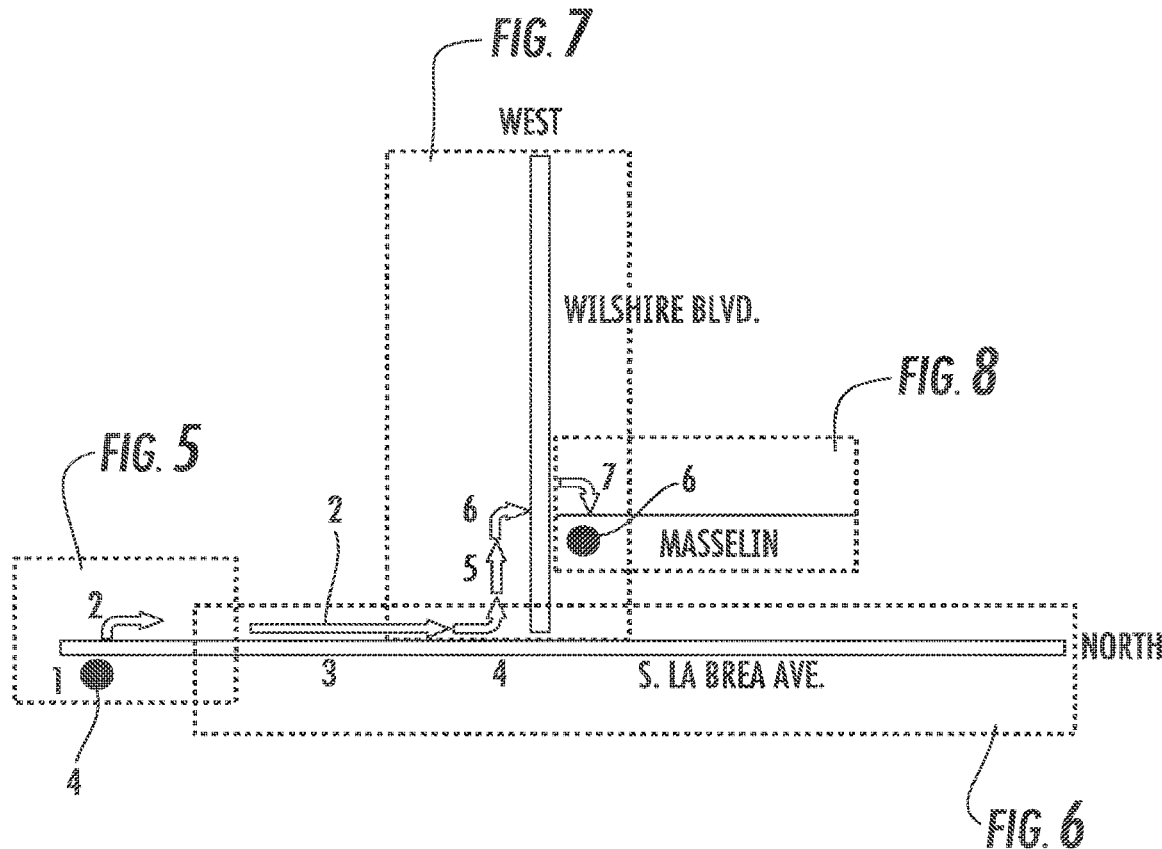
FIG. 4 is a map of the same trip as depicted in FIG. 2, generated in accordance with the method and system of the present invention.

Turning now to the figures, the present invention is best illustrated by providing an example of its use for the purpose of planning and following a point-to-point travel route. FIG. 4 illustrates an overall travel route 2, as it would be displayed using the navigational method and system of the present invention. A user inputs a departure location 4 and an arrival destination 6 and the system provides a schematic display representing the route 2 in simple and linear terms. As can be clearly contrasted with the prior art mapping systems of the prior art as depicted in FIGS. 1-3, the present invention depicts all of the relevant roadways in a linear pictographic manner. That is, each road that is traveled along the overall travel route is depicted as a straight line with all landmass features removed. This does not mean that all relevant information is removed from the displayed map, only that the display of the route is simplified by removing all of the landmass features and the various twists and turns of the given road. In other words, the present invention uses linear pictograms that look very much like the real life road surfaces they represent, however they are represented linearly regardless of whether the actual roads being represented are straight-line or curved. This prevents the need to continually reorient the map to match the actual travel direction being followed as the user travels over a winding road, thus reducing the level of cognitive distraction.

Additionally, the pictograms used by the present invention could be made to resemble specific types of roads e.g. city streets, highways, fords, etc. Other pictograms could represent man-made and natural features such as bridges, tunnels, buildings, rivers, etc. This can be accomplished by graphic design techniques such as showing the number of lanes typical for that type of road, and lane separation markers (e.g. single white dashed line, two solid yellow lines, etc). For example, a two-way street with one traffic lane in each direction can be shown as two parallel lines and a gray background between them with a white dotted line down the middle. Further, pictograms or portions of pictograms could be actionable objects which, when selected by the user, would offer the user additional information and/or access to more capabilities. For example, by selecting a pictogram of the current road segment, the present invention could show historical, entertainment, and other information such as average daily traffic volumes, traffic accident rates, the date when this road's construction was completed, the number of tons of concrete used to build this road, famous personalities that have traveled on this road, famous events that have taken place on or near this road, etc.

As can be further seen from the route overview provided in FIG. 4, each leg of the planned travel route 2 is further broken down road by road for individual display on subsequent sequentially displayed screens. Specifically, each portion of the trip between major transitions points, such as turns onto new roads, is depicted on its own sequentially arranged display screen.

Figure 5:
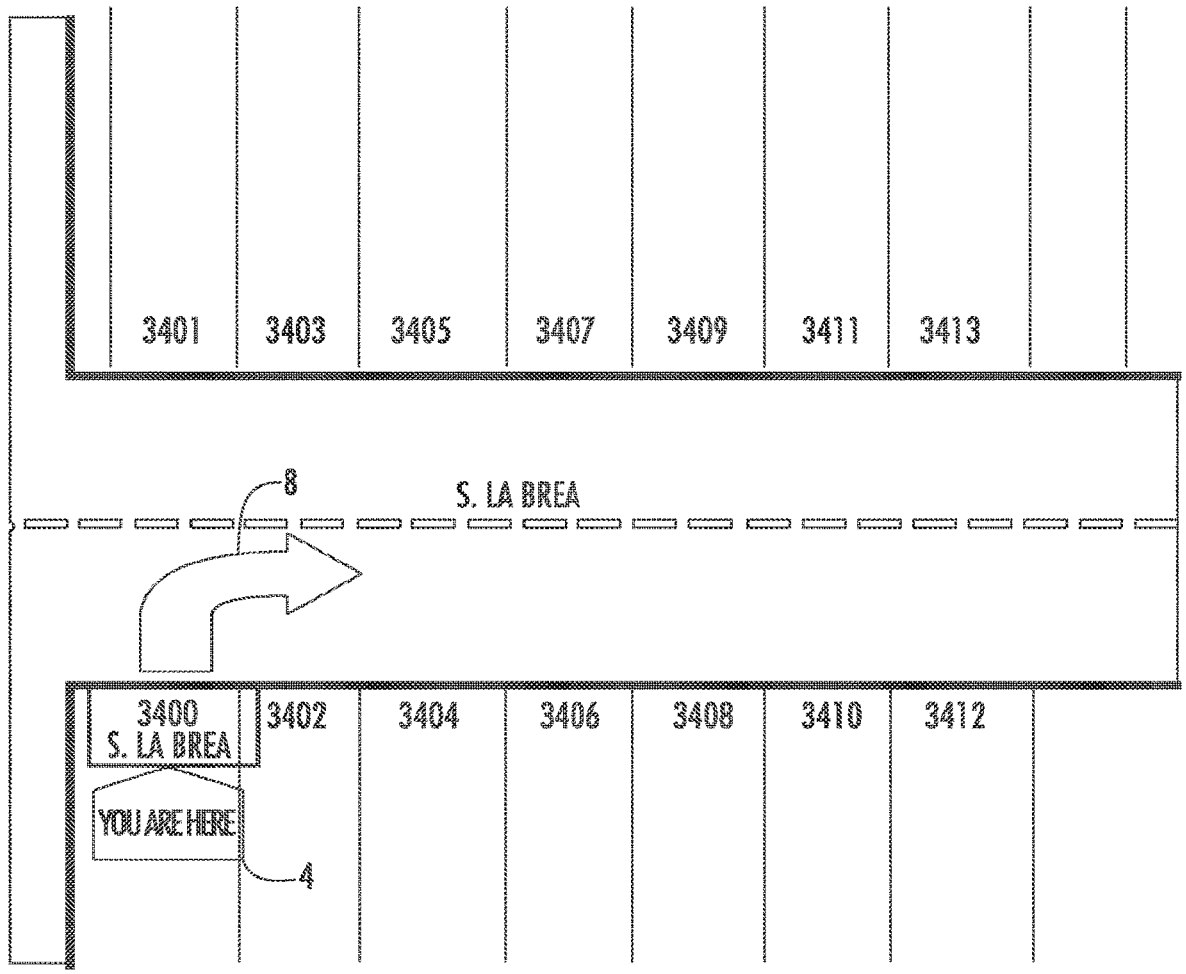
FIGS. 5 to 8 show the detailed maps of each of the four segments of the trip shown in FIG. 4, produced according to the present invention.

FIG. 5 shows the user departing from the departure location 4, which is indicated as 3400 S. La Brea. The display screen provides the user with directions to commence the planned travel route 2. Specifically, the user is to turn right onto S. La Brea from their current location as is indicated by the arrow 8.

Figure 6:
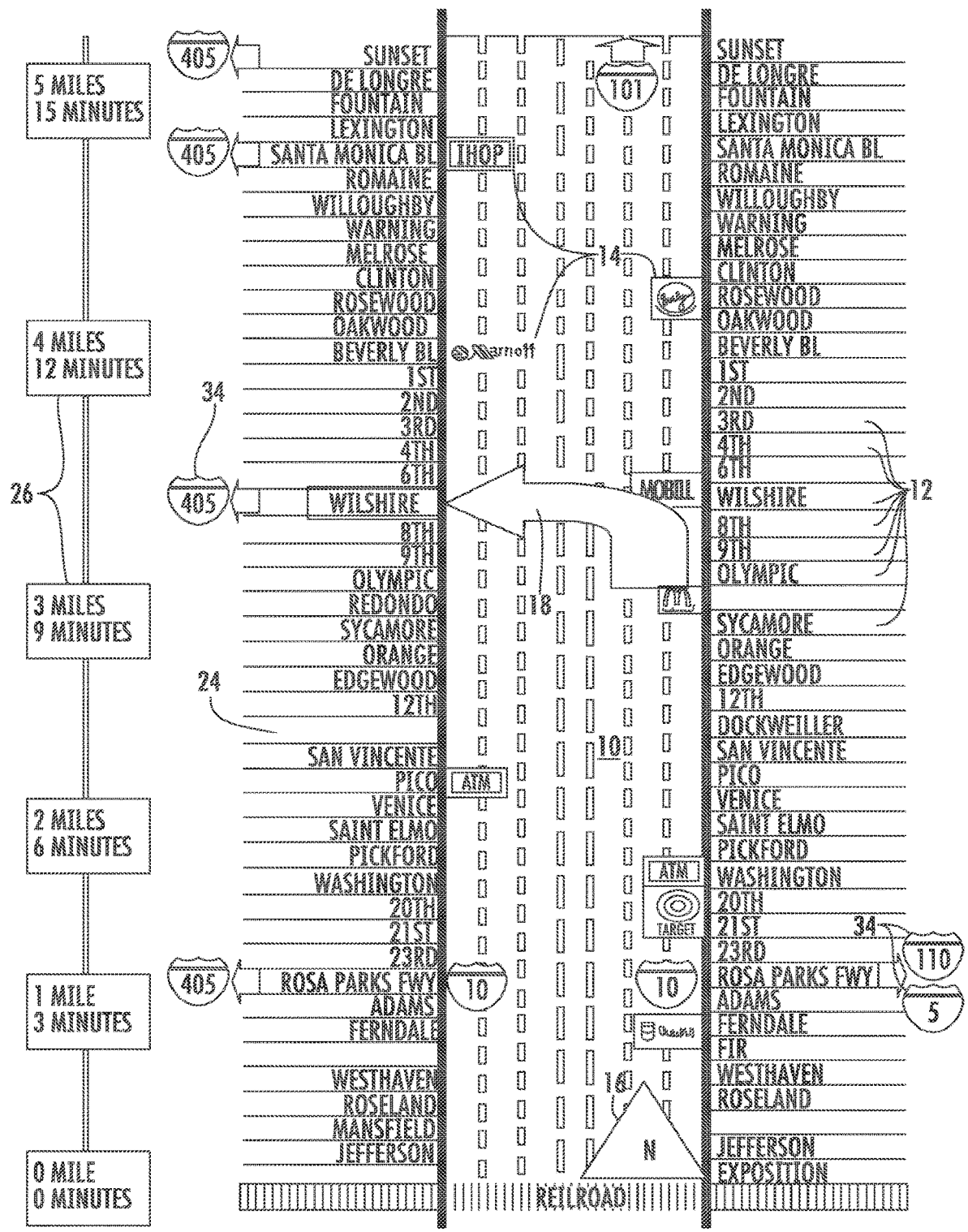

Once the user turns right onto S. La Brea, the display updates to indicate the new location of the user as is shown in FIG. 6. The display in FIG. 6 is an exemplary map of a current road segment 10 that is a portion of S. La Brea Blvd., generated according to the present invention. The pictogram of the road segment 10 in the center of the map is oriented in the direction of travel. In other words, the pictogram that represents the road 10 on which the user is traveling is always oriented in an up and down forward facing manner. Further, the road 10 appears as a straight line, without any of its actual curves. With respect to the graphic representation of the roadway 10, the overall pictogram resembles, fairly closely, what the road segment 10 looks like in real life, and was selected because it most closely matches the attributes for this road segment 10 that were found in the database used by the present invention. The pictogram shows the actual number of lanes, the traffic directions, and every single intersecting road 12, which would be encountered in real life if a user were to travel over the entire length of the road segment 10 shown. In addition, a number of points of interest 14 are shown, such as Chevron™ and Mobil™ gasoline stations, McDonalds™ and Burger King™ fast food outlets, IHOP™ restaurant, several ATMs, a Marriott™ hotel, and department stores Target™ and Kmart™ thereby providing the users with landmarks to help orient the user to their surroundings and enhance the users' comfort level as they progress along the travel route 2. (Chevron, Mobil, McDonalds, Burger King, IHOP, Marriot, Target and Kmart are the trademarks of their respective owners). The current location 16 of the user is always shown near the bottom of the map in addition to a depiction of the current travel direction bearing, in this case, North. Near the center of the display is another large arrow 18 indicating the location where the user will have to turn left to continue traveling on the planned travel route 2.

Figure 7:
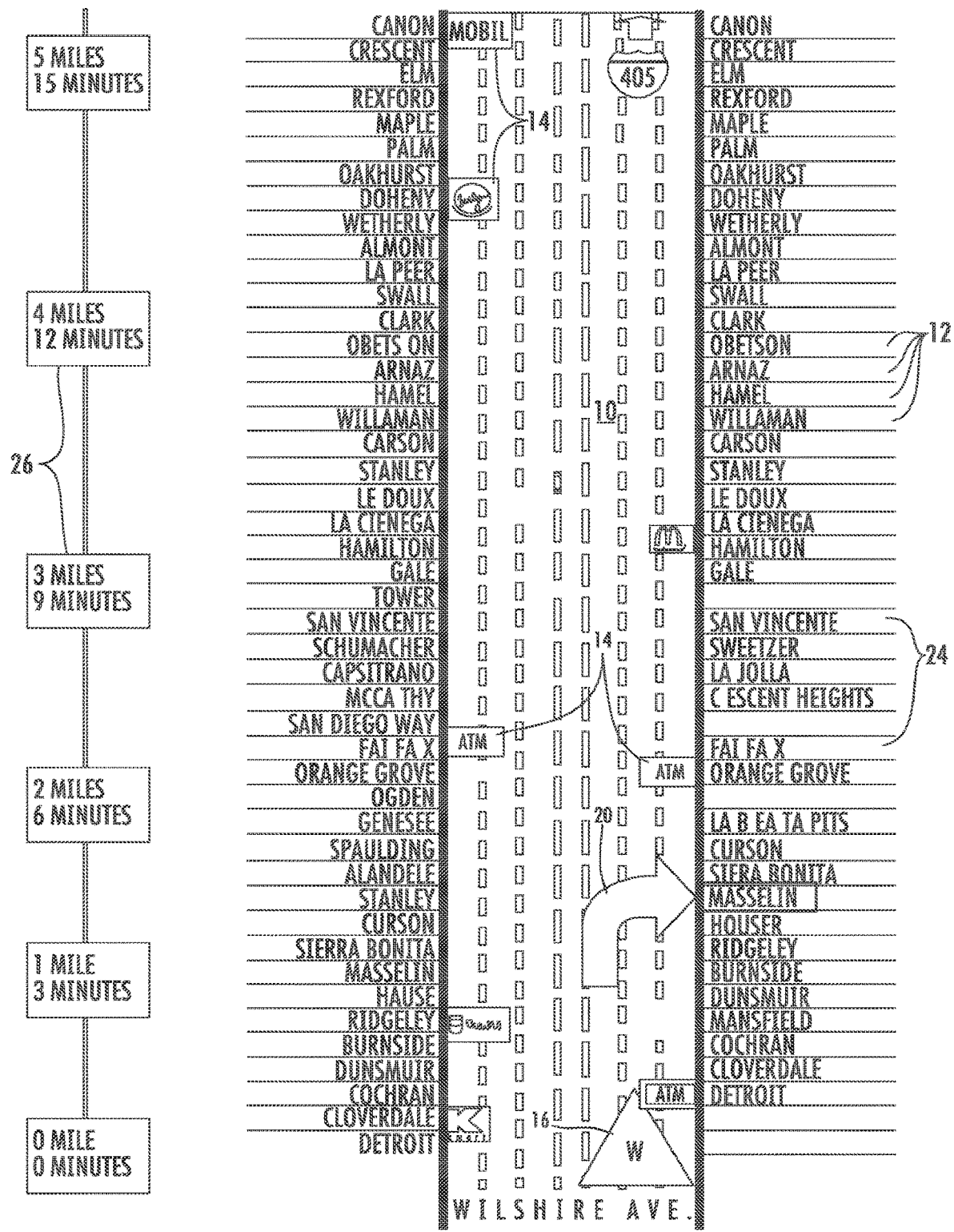

Once the user follows the directions by following the arrow 18 and taking a left turn onto Wilshire, the display again updates to a depiction such as is provided in FIG. 7. In particular, FIG. 7 shows the first road segment 10 of the Wilshire road that would be displayed if the user turned left (going West) onto Wilshire from La Brea. Again, note that although the user is now traveling west, the road segment 10 is oriented in an up and down fashion. Again an arrow 20 is provided to tell the user in a graphic manner that a right turn is imminent if the user plans to remain on the preset travel route 2.

Figure 8:
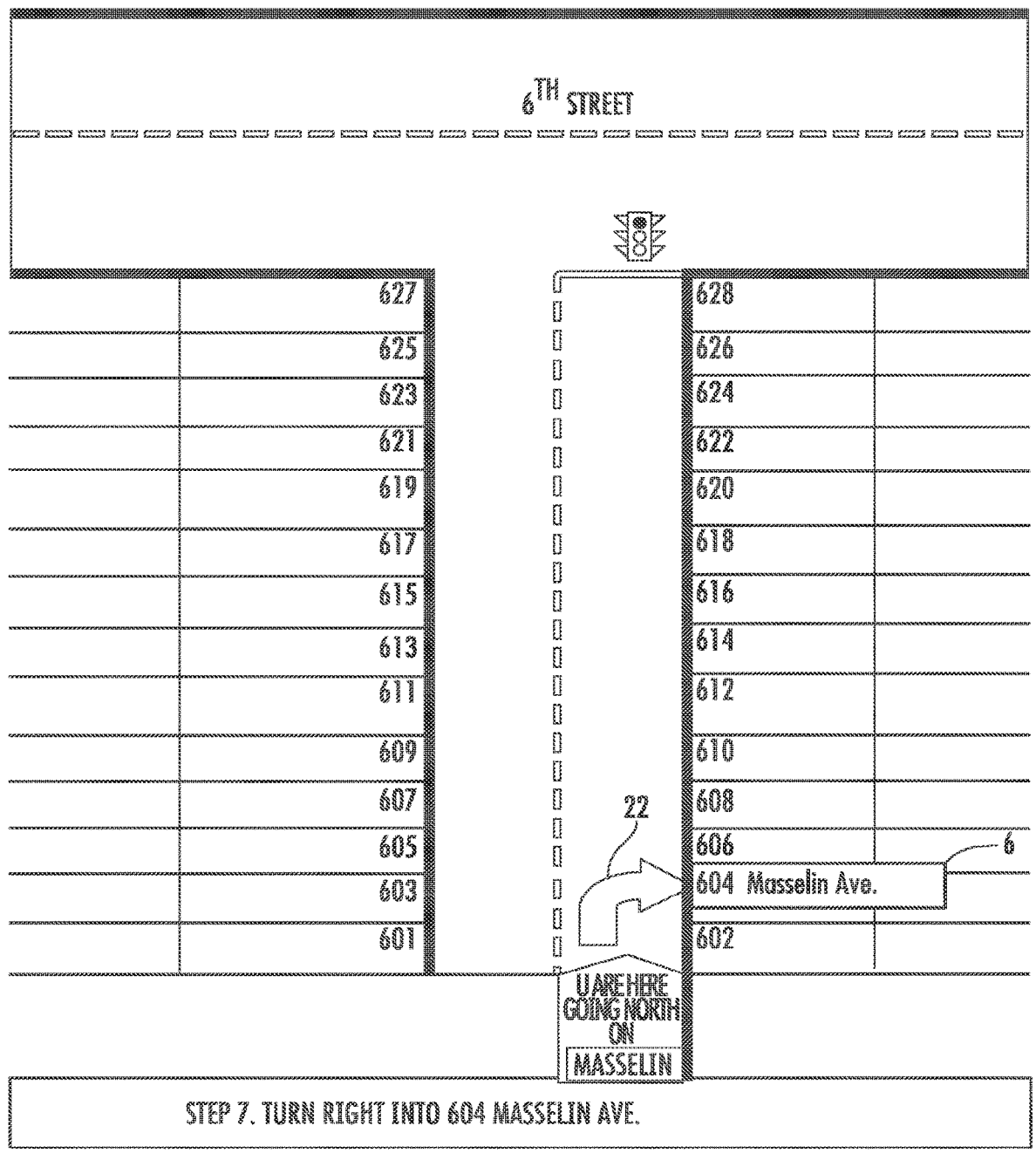

Finally, FIG. 8 shows the user where the entry for the final destination location 6 for this travel route 2 is located again by using a graphic arrow 22.

As was illustrated by the example provided in FIGS. 4-8, maps generated according to preferred embodiments of the present invention show roads 10 in topological fashion rather than using the geographic method as was utilized in the prior art. By representing the roadways 10 topologically, the present invention allows for the compression of all of the positions of the road intersections so that many more intersections can be shown in a single map image. To further assist in the compression of the image, all of the roads 10 are represented in a linear manner, thereby eliminating all of the curves and turns that a roadway normally takes, and they intersect the current road segment at a right angle (perpendicular).

In depicting the various roadway segments 10 in this fashion, the present invention is utilizing a fixed presentation template wherein the information shown on displays and printouts is predictable and consistent from road segment 10 to road segment 10. This predictability of data presentation of the present invention frees up users' attention due to reduced visual search time. For GPS-based systems installed in vehicles it also reduces the incidence of trip interruptions due to feature lockouts. To maintain the predictability with respect to the location of informational data, the pictogram display provides for the current road segment 10 to be positioned at or near the middle of the display leaving a substantially equal amount of visual space for showing the names of the intersecting roads 12 on the left and right sides of the current road segment 10. In addition, when a road intersects the current road segment 10 on both sides, the intersecting road 12 name is shown both to the left and to the right of the current road segment 10. Similarly, when there is an intersecting road 12 on one side only, the opposite side is left blank 24, so that subsequent roads that intersect on both sides of the road 10 can continue to be aligned.

In addition, the present invention substitutes the geometrically-indicated and true to scale distances of cartographic maps, with numerically-indicated distance markers 26. This increases the amount and readability of the information that can be displayed and/or printed. In this manner, while all of the features of the map are depicted relationally, they are not placed using any particular predetermined map scale. For example, as can be seen along the left side of the display in both FIGS. 6 and 7, the distance and estimated travel times 26 are shown adjacent intersecting roads 12 and/or exits to indicate the distance and estimated time to reach them from the current location of the user. These distance markers 26 could indicate specific distance intervals and may be displayed in imperial units or metric units, such as for example, miles, yards, feet, kilometers, meters or any other suitable distance measurement system. Additionally, the distance markers 26 could be set at different distances on different road segments 10 for the same travel route 2, depending on the level of detail and the number of intersections 12 in the specific road segment 10 being displayed. Further, the distance markers 26 are updated based on the current position 16 of the user so that each of the distances and estimated travel times to the upcoming intersections 12 are accurate based on the current position 16 of the user.

In the pictographic view of the present invention, the roads that intersect 12 the current road segment 10 being displayed are listed in columnar format (or if the map is oriented side-to-side, in row format) in the same order that they would be encountered if the user were traveling the actual road in real life. The intersecting road 12 names are written horizontally (or if the map is oriented side-to-side, they could be written vertically) in plain text, and are arranged substantially equidistant from each other, regardless of the actual distance between intersections 12. They are positioned far enough from each other to be able to locate and read each one of them easily at a glance, yet as close as possible to each other so as to minimize the total height of the column of names (or width, if the map is displayed side-to-side). This allows the display to depict as long a segment of the currently displayed road 10 as possible within the available space of the page or display monitor. Further, while in the preferred embodiment the columns or rows representing cross streets or intersections 12 are equidistant, it is also possible that the intersecting roads 12 could be positioned at proportional distances from each other, in a substantially similar relationship to that in the real world.

Figure 9:
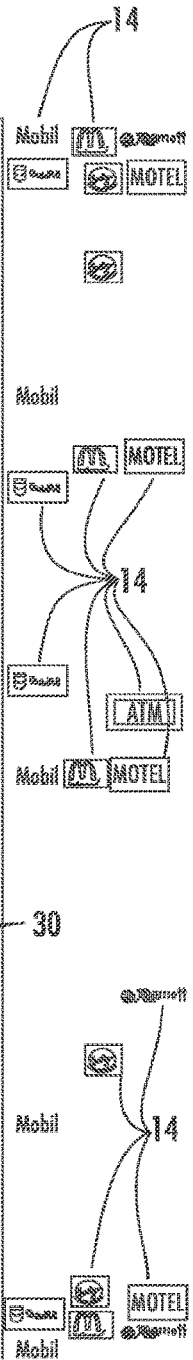
FIG. 9 shows a representative map for a typical freeway-type road segment, generated in accordance with the method and system of the present invention.
Figure 10:
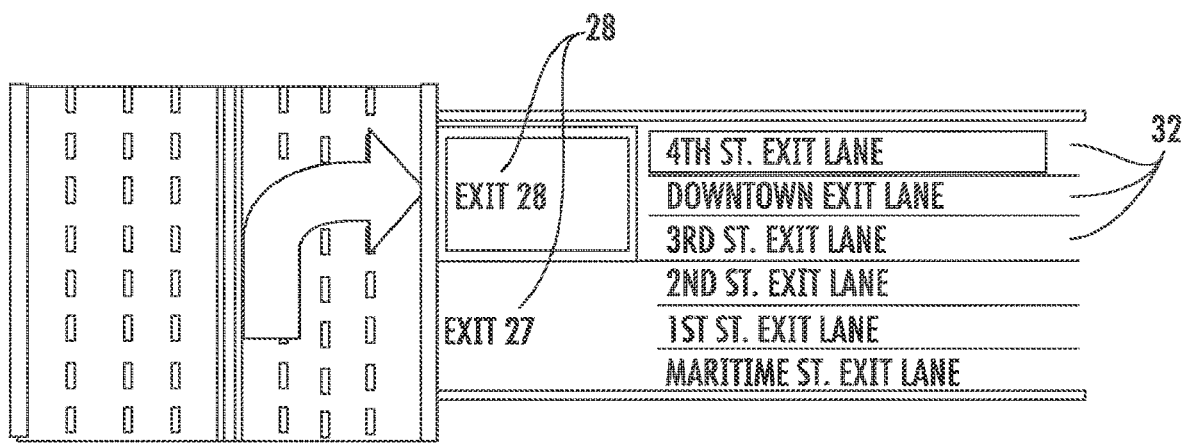
FIG. 10 shows a representative map for a typical multiple lane freeway exit, generated in accordance with the method and system of the present invention.

FIG. 9 further serves to illustrate the display of the present invention wherein the pictogram represents a multi-lane highway 27. A user can easily see that the current roadway 27 is a divided highway with four travel lanes in both the Northbound and Southbound directions. Further, each of the exit ramps 28 is indicated in columnar format along with the surface streets 30 that those exits 28 serve and the amenities represented by icons 14 a user would expect to find on those streets 30. Further, FIG. 10 serves to illustrate the information provided to a user as they take one of the available exit ramps 28. The user is provided with an expanded view of the available surface roads 32 and the directions to turn once they exit off of the ramp 28.

For all intersecting roads 12 that lead to a highway or freeway entrance, the highway or freeway names 34 could be grouped and displayed in left and right columns, which may be used solely for displaying connecting highway and freeway names 34. For example, see the highway medallions 34 displayed in FIG. 6. Similarly, as is shown in FIG. 9, an indication could be shown that a certain point of interest 31 not located on the current road segment and/or an important road 30 that does not intersect the current road segment 26, can be reached via a road or exit 28 intersecting the current road segment 27.

Figure 10A:
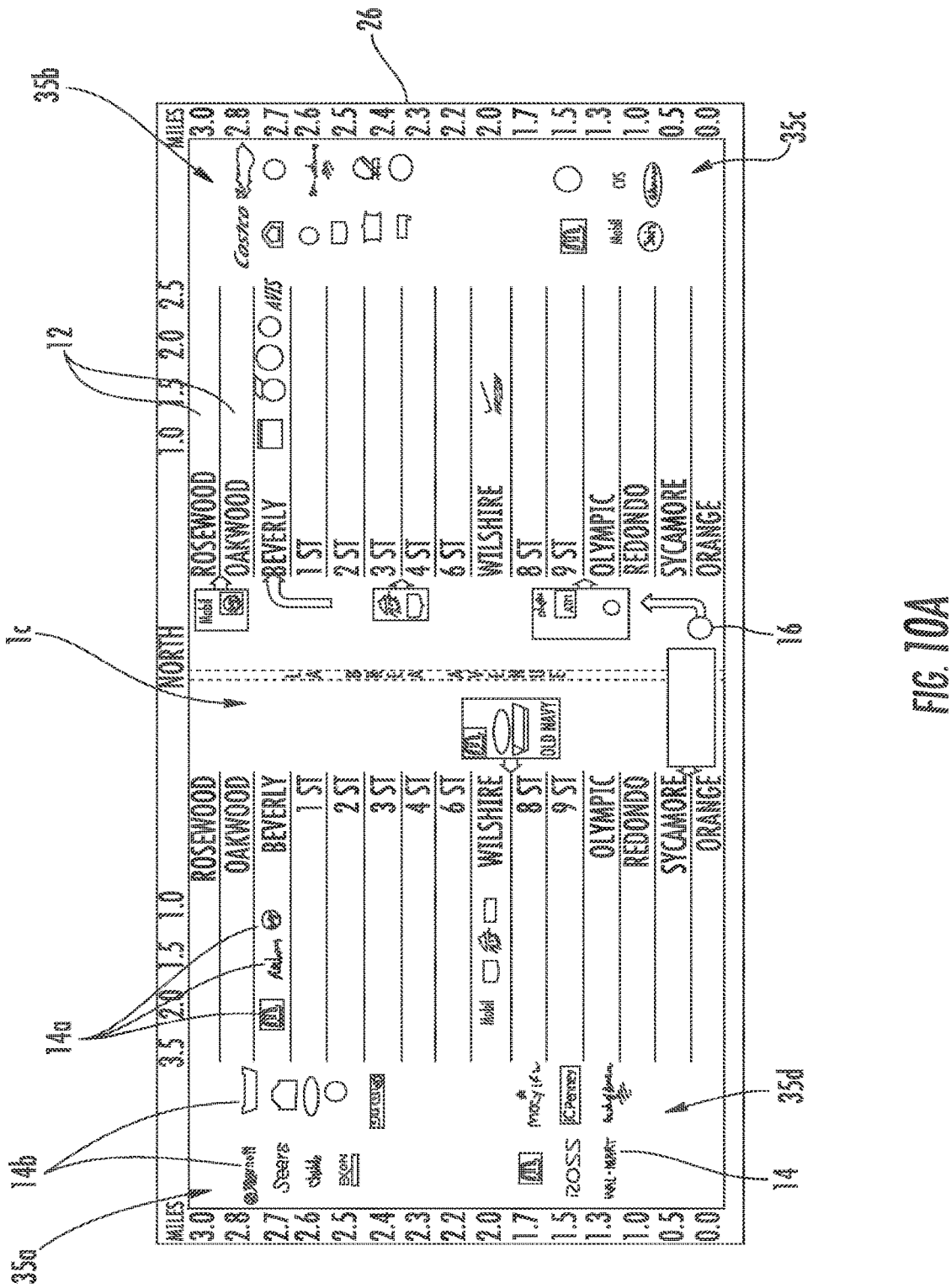
FIG. 10A graphically illustrates the present mapping system including icon clouds geographically representing points of interest near the current location but outside of the roads depicted by the system.

Turning to FIG. 10A, there is shown another extension of the concept including point of interest icons 14a displayed on the intersecting streets 12 in the order of encounter on the intersecting street 12. Noticeably, the icons are not spaced out by geographical distance, but instead are simply placed in the order of encounter. This non-spaced linear arrangement provides for the most efficient use of space on the map for increased marketing and advertising revenue.

Additionally within FIG. 10A, there are groups or "clouds" 35a, 35b, 35c, 35d of icons 14b positioned in a peripheral information area outside of the central map area. These icons 14b represent points of interest that are not located on the roads 10, 12 shown within the central map area, but are located within a specified distance from the current location 16 on roads that can be accessed via roads 10, 12 shown on the map. In the configuration as illustrated, the icons are grouped into 4 groups, based on their general geographic direction from the user. However, the specific grouping is not critical to the concept. This arrangement allows for the user to identify a particular point of interest in a general quadrant of the map and aid in navigation to or from a point either with or without a specific destination. This also allows for a very compact user interface showing as many points of interest 14 as possible in the smallest possible space. This is another important extension of the non-spaced, linearly compressed model of mapping.

Figure 11:
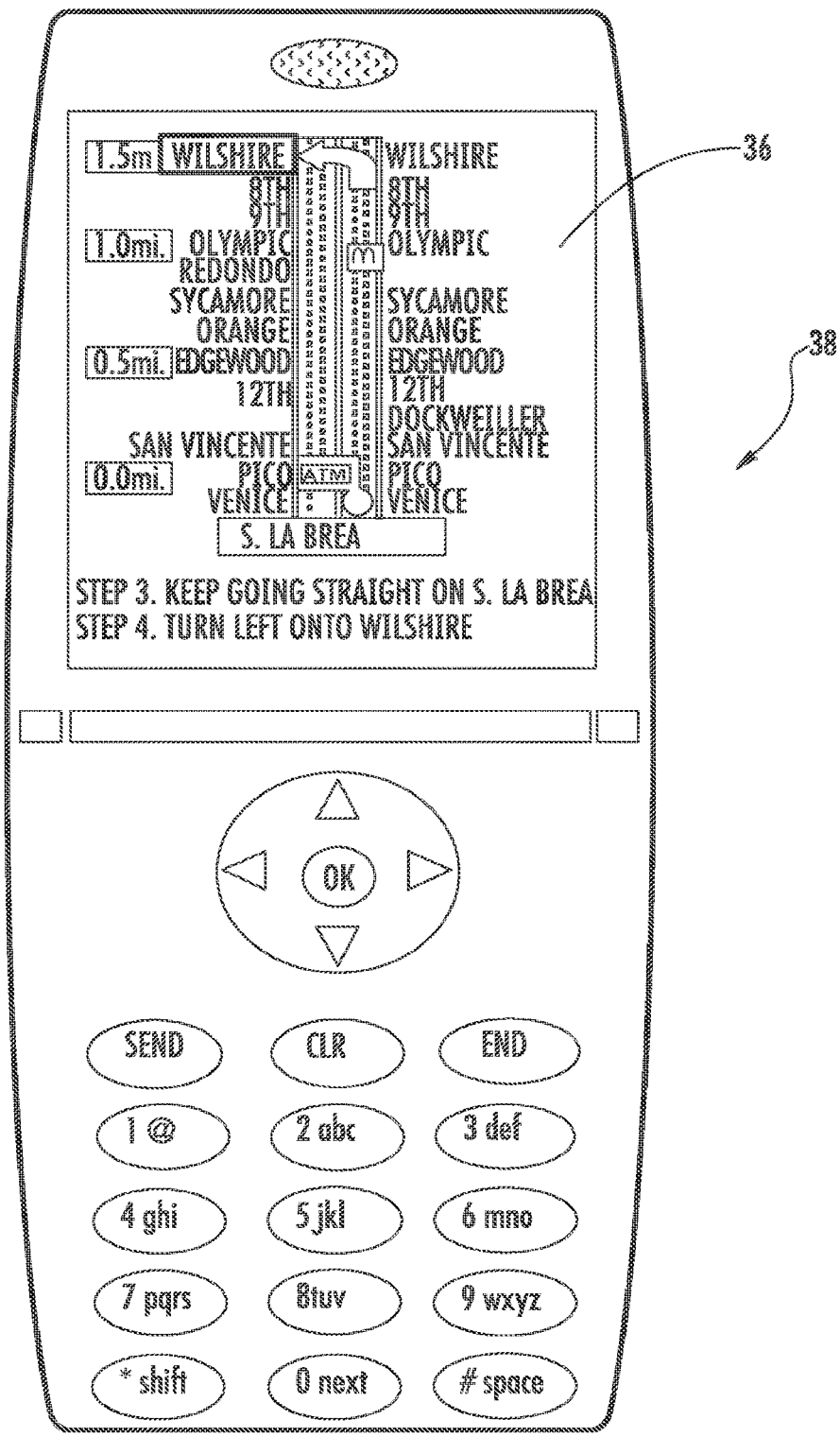
FIG. 11 shows a map generated in accordance with the method and system of the present invention as displayed on the screen of a cellular telephone.
Figure 11A:
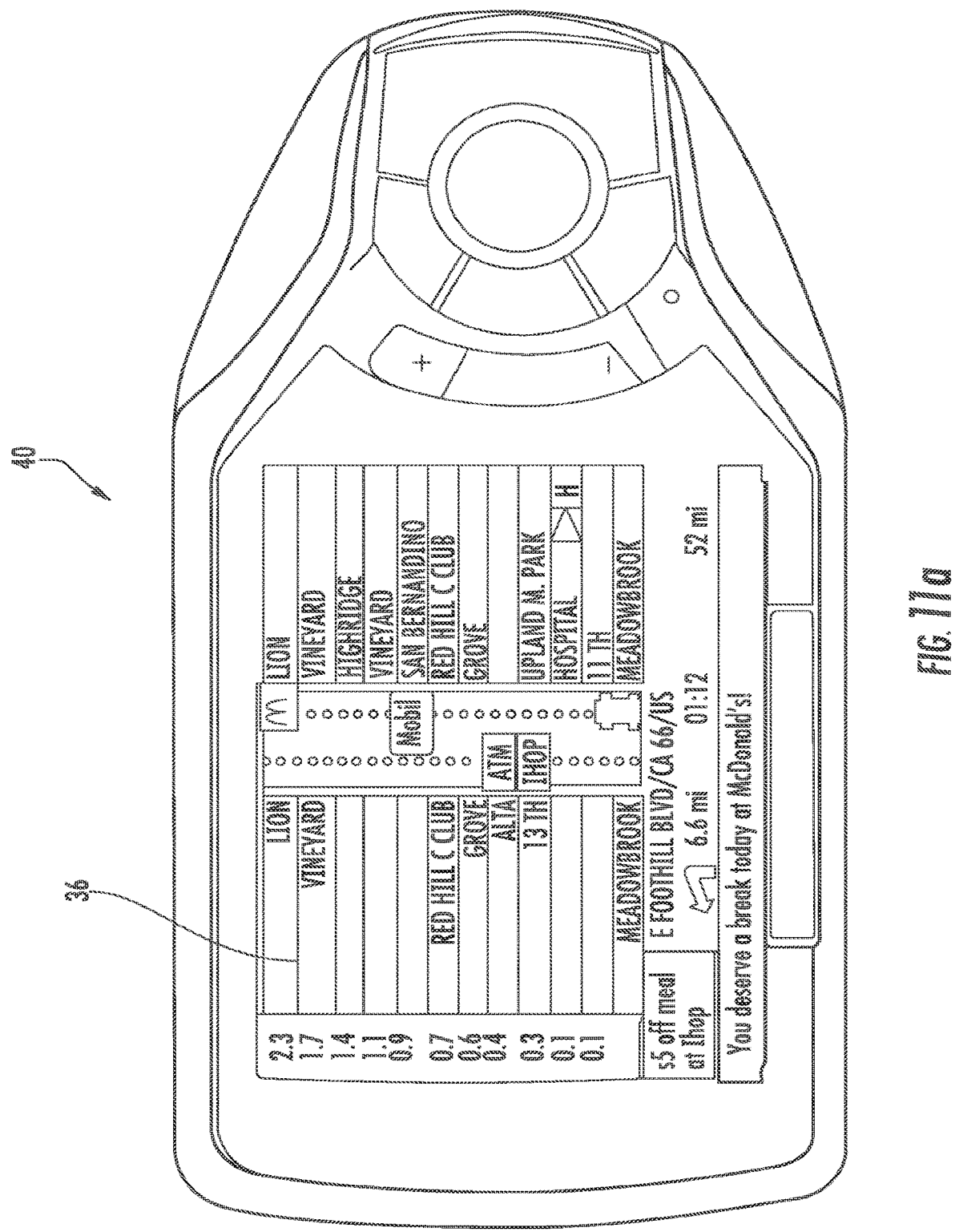
FIG. 11a is an example of a standalone device used for display of navigational information in accordance with the present invention.

Turning to FIGS. 11 and 11a, the apparatus of the present invention is shown represented as a display 36 on a cellular telephone 38 or as a conventional GPS type navigation device 40 that may take the form of a road map display or a navigational device. Similarly, the device may consist of a permanently installed GPS, personal computer, personal digital assistant or a personal computer and still fall within the scope of the present invention.

Figure 11B:
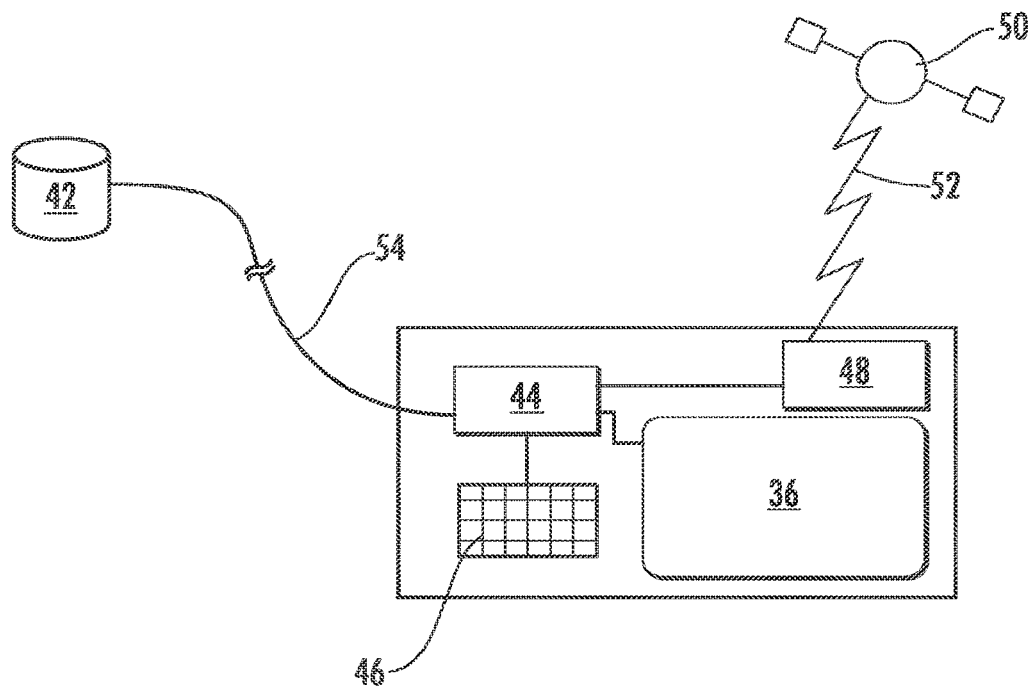
FIG. 11b is a schematic drawing depicting one embodiment of the elements of the system of the present invention.
Figure 11C:
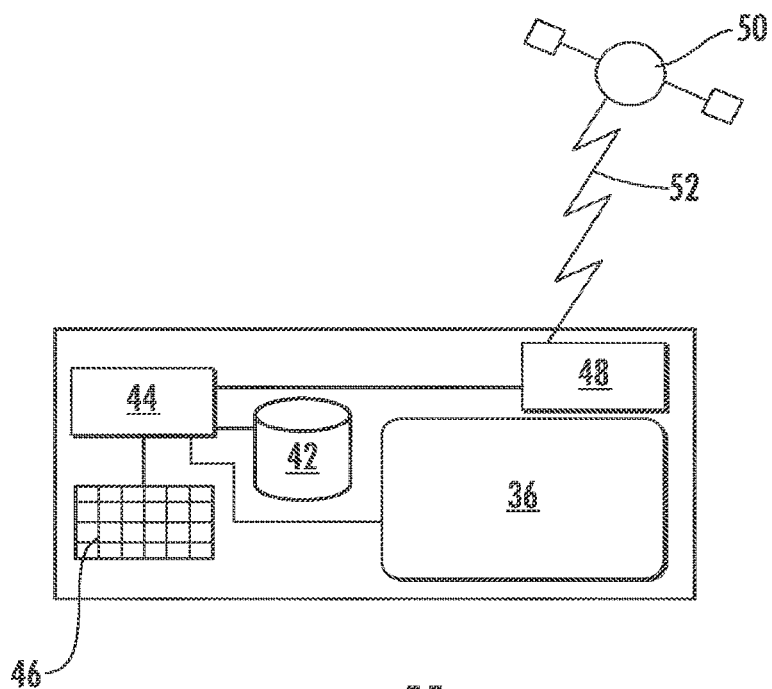
FIG. 11c is a schematic drawing depicting an alternate embodiment of the elements of the system of the present invention.

As is further depicted in FIGS. 11b and 11c, the apparatus of the present invention includes at least a display device 36, a storage means 42 for storing road map data therein, a means for generating and displaying 44 a pictographic view of roads on said image display device 36 based on said road map data located in said storage means 42, and an input device 46 coupled to the means for generating and displaying 44 a pictographic view of the roads. In this fashion, the input device 46 allows for a user to provide input into the apparatus that is used to determine, in part, what road map data is used in generating the pictographic view. When enabling the apparatus as a navigational aid, the apparatus further includes a position-sensing receiver 48 for receiving signals 52 containing position information and determining a current position of said road map display apparatus. The position-sensing receiver 48 for example may be a GPS enabled receiver that receives position data 52 from a network of GPS satellites 50. In turn, the position-sensing receiver 48 transmits the positional information to the pictographic generating device 44 for use in connection with navigational calculations and the generating of the roadway pictographs.

It can also be appreciated by one skilled in the art that the storage means 42 may be any form of storage medium known in the art. Further, the storage means 42 may be maintained as a storage database that is loaded and retained within the housing of the apparatus itself. Alternately the storage means 42 may be a database that is maintained at a remote location and accessed by the apparatus via an electronic network 54. Such a network 54 may be wired or wireless and may take the form of a wired internet connection, WiFi, wireless broadband, Bluetooth or any other suitable electronic communications type network.

The input device 46 may also be any type of known user interface in the art and the various features of the present invention are accessible via different means designed for maximum accuracy and ease of use. For example, when the display device 36 is a touch-screen display monitor it will also serve as an input device 46, wherein text and graphics could be made "actionable", i.e. the user can touch displayed objects such as words, pictograms, logos, icons, lines, points, areas, or photographs to obtain information about the things, events, places, people or ideas represented by the objects touched and/or start a processing task. For example, if a user were to touch the Kmart logo on FIG. 7, the present invention could display the exact address of the store, operating hours, telephone number, and merchandise on sale. The user could then select one of the items on sale and order it. Similarly, when touching the IHOP restaurant's icon in FIG. 6, the user could be shown the menu and allowed to make a table reservation. Alternately, the user may use any one or more of the devices and methods typically used by people in order to communicate with computing devices, including tapping a keyboard key, moving a pointing device, gliding a finger on a touch-pad, pressing a button, sliding a lever, tapping a touch-screen display monitor, moving a yoke, using a joystick, speaking into a microphone, etc. for use as an input device 46.

Figure 12:
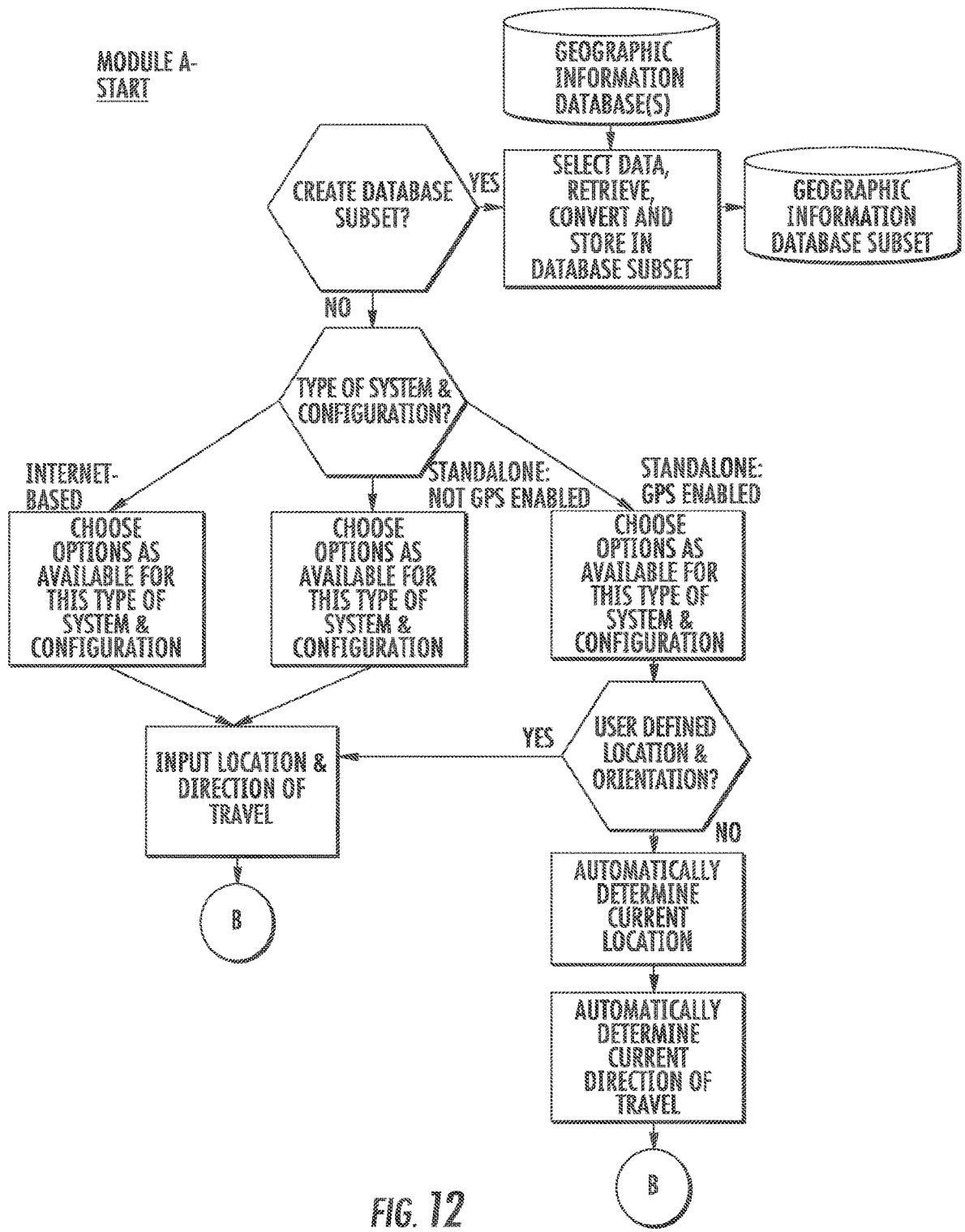
FIG. 12 is a flowchart depicting a start module for the method of the present invention.
Figure 13:
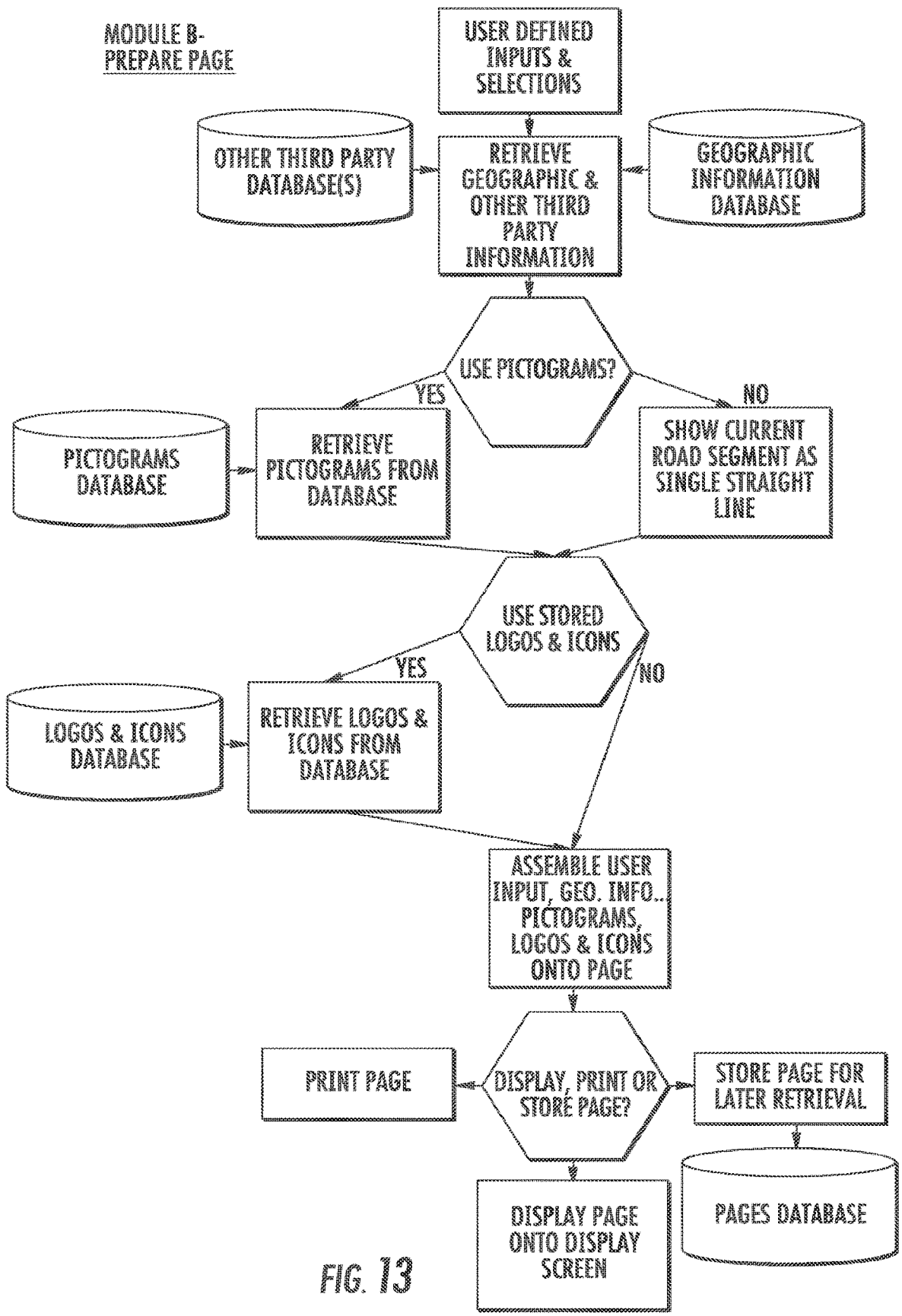
FIG. 13 is a flowchart depicting a page generator module for the method of the present invention.

In accordance with the teachings of the present invention, flow charts are presented in FIGS. 12 and 13 to depict potential logic structures that may be utilized to enable the method of the present invention. In general terms, the present invention provides method of displaying a sequential set of road segments 10 wherein the sequential set of road segments 10 forms a cohesive set of navigational directions to a desired destination. In the method, a storage means 42 is provided that contains a plurality of road segments 10 or geographic information. As was stated above, this information may be maintained resident on the device, or at a remote location. A user interface is also provided that is coupled to said storage means 42 via a direct connection, or by any other electronic communication network 54 means, either wired or wireless, as is known in the art, wherein the user interface also includes an input device 46. Also included in the user interface is a display generator 44, such as a computer processor, that is in communication with the storage means 42 and input device 46. In operation, the display generator 44 operates to create a visual display in the form of a linear pictogram of the desired road segments 10 by obtaining input from said input device 46 and generating a sequential set of road segments 10 selected from the plurality of road segments stored in the storage device 42. The sequential set of road segments 10 are selected based on the input from the input device 42, and in this case, a manual indication by the user of the current or starting position desired. Once the sequential set of road segments 10 are compiled, they are sequentially displayed as a pictographic view of the set of road segments 10, as described in detail above, in the form of navigational directions, or a travel route 2. Further, if the user interface device were formed to include a position sensing receiver 48 for receiving signals 52 containing position information, such as a GPS enabled receiver 48, the GPS receiver 48 would also be in communication with the display generator 44. In this manner, the GPS receiver 48 would determine the current position of said user interface, and in turn, provide this information to the display generator 44 for use in generating the display and navigational instructions, or travel route 2. Since the details for this particular portion of the process are well documented in the prior art, there is no need for further discussion of this feature herein.

Figure 14:
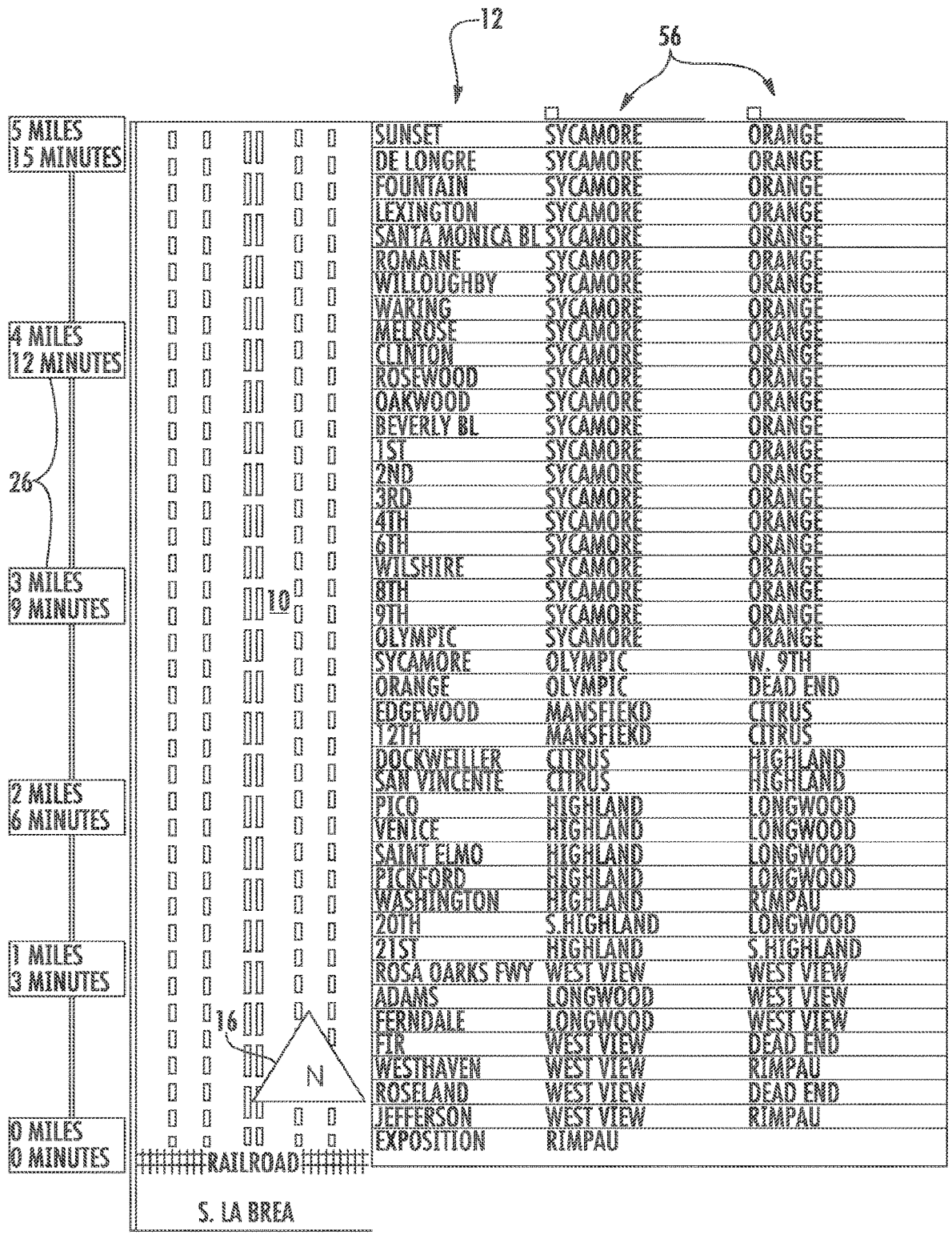
FIG. 14 is a typical map display shown when using the "explore" feature of the present invention, in text format.

Turning to FIG. 14, the explore feature of the present invention is illustrated. In columnar fashion adjacent the first set of data indicating the immediately intersecting streets 12 that contact the present segment of the roadway 10 being traveled are each of the other interconnected streets 56 that can be reached by traveling down one of the immediately intersecting streets 12. In this fashion, when a user is trying to find a destination that is not fully known, or is simply trying to explore a geographic region, they can determine, at a glance, the various relationships between the streets in a particular region.

Figure 15:
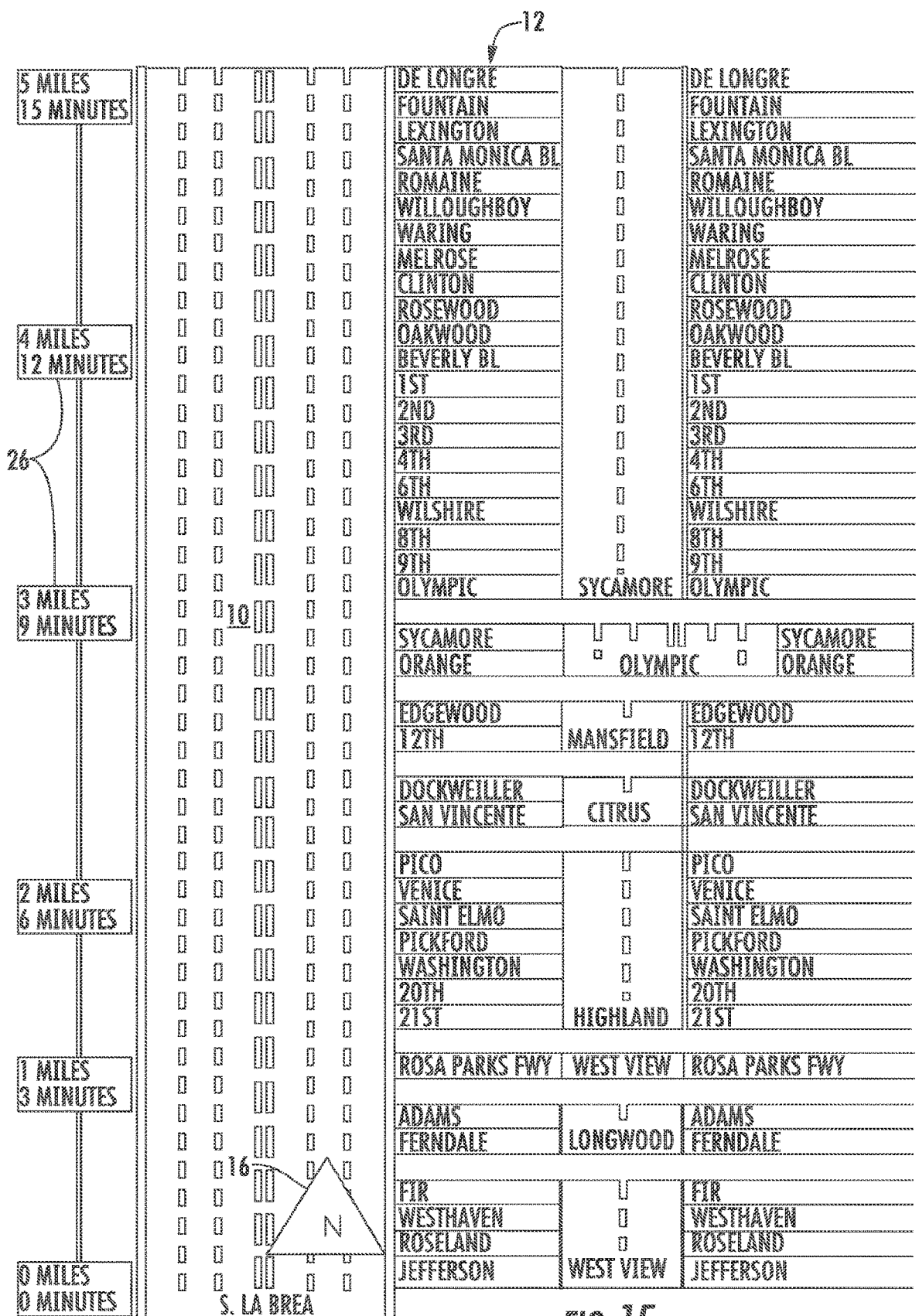
FIG. 15 is typical map display shown when using the "explore" feature of the present invention, in pictographic format.

Further, FIG. 15 illustrates that two or more pictograms could be shown together in certain cases, such as when a series of turns need to be made close to one another, or when exploring areas adjacent to the current road segment.

Figure 16:
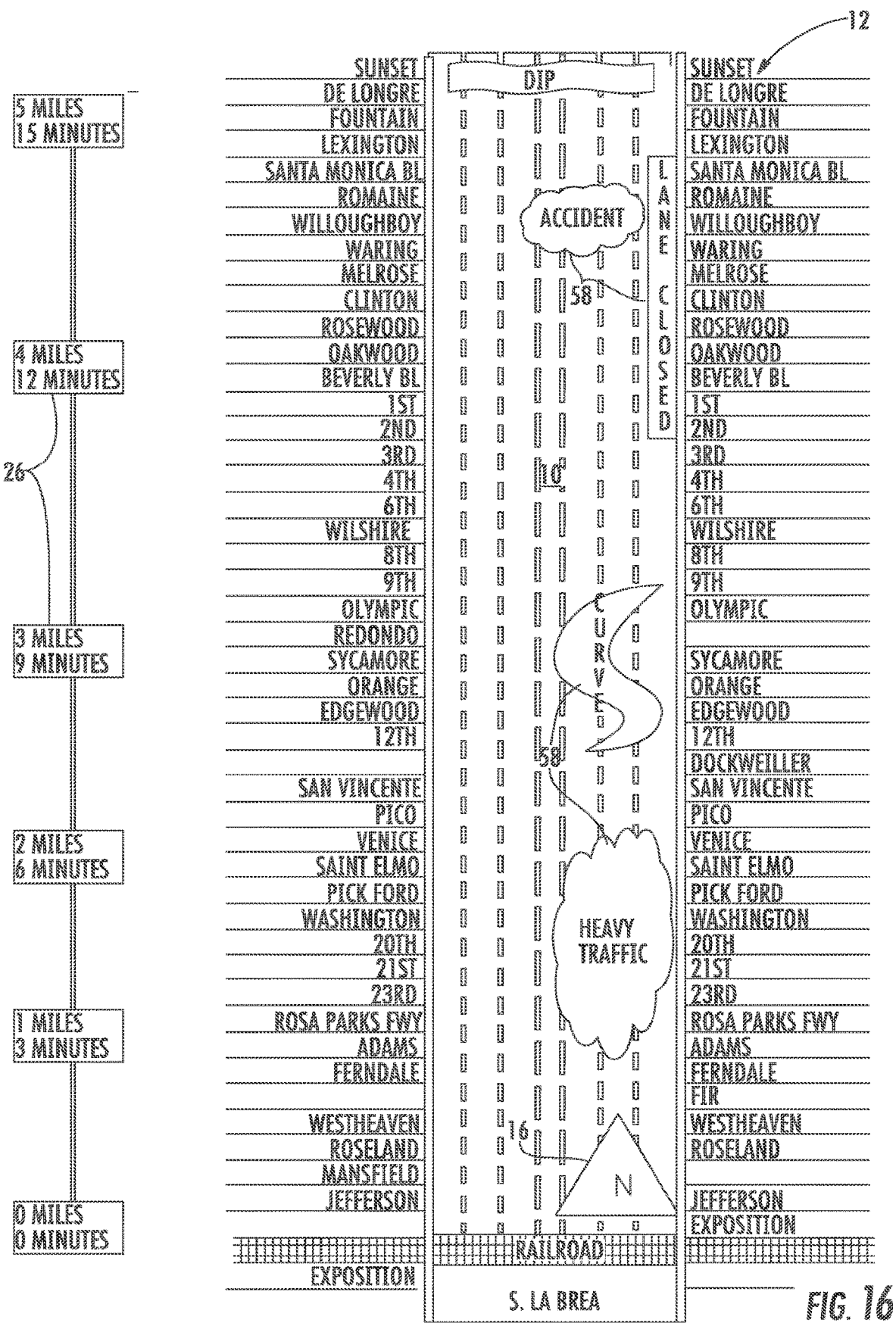
FIG. 16 shows a few typical road and traffic hazards, as they would appear on a map created according to the present invention
Figure 17:
FIG. 17 is an example of a typical shopping block view as depicted in accordance with the present invention.
Figure 18:
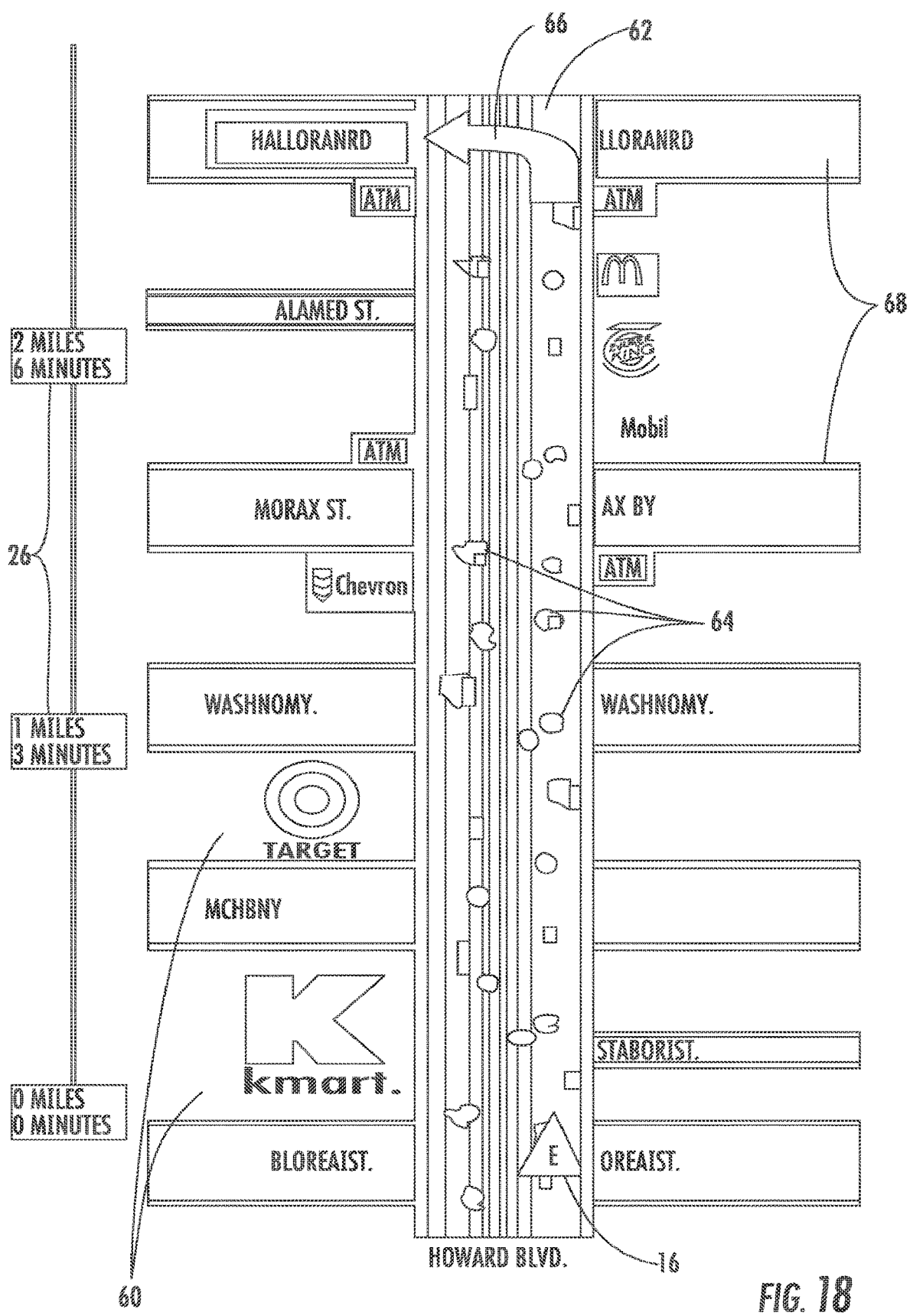
FIG. 18 is an example of a map depicting the integration of real-time traffic information in accordance with the present invention.

FIGS. 16, 17 and 18 all depict additional information that may be superimposed onto the pictogram display of the present invention. The additional information may be in the form of identifying road hazards 58 along the particular road segment 10 being traveled, such as is presented in FIG. 16. Further, FIG. 17 provides a roadway 10 pictogram that represents a typical shopping street. Certain companies 60, such as Staples™ and Ralph's™, who would have paid advertising and/or promotional fees, are shown more prominently, by using distinct background colors, their company logos and different fonts. (Staples and Ralph's are the trademarks of their respective owners). In addition, Staples is shown to be offering a 20% discount coupon for computer paper, for which a code number and a short description are shown. Users of the present invention could immediately pull into Staples just ahead on the left hand side, and request the 20% discount when purchasing computer paper, provided they mention the special discount code.

FIG. 18 depicts a main road segment 62 with a superimposed real-time photographic image showing the traffic 64 over the 3 miles ahead of the driver. The driver's position 16 is indicated with a red arrow near the bottom of the road 62, and the direction of travel is east. A red arrow 66 near the top of the road 62 indicates that the driver needs to make a left turn onto a road named "Halloran Rd.". The intersecting roads 68 are depicted pictographically, in proportional relationship with the real world rather than in the equal spacing relationships that were discussed earlier. Further, as indicated with respect to FIG. 17, advertisers with locations along the road have their logos prominently showcased at their places of business 60 along the road 62.

Figure 19:
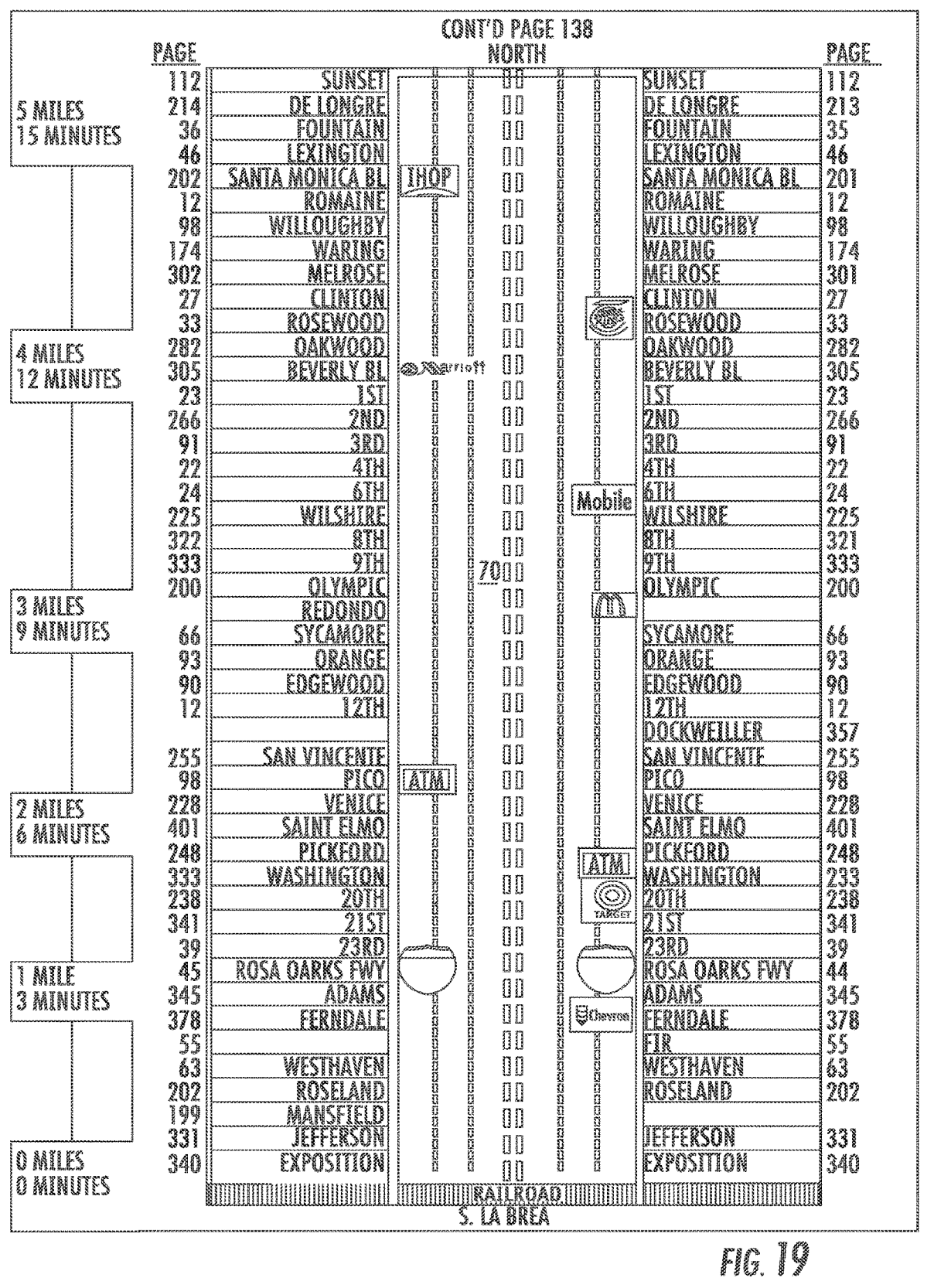

Turning now to FIGS. 19 and 20, an alternate embodiment of the present invention provides for the use of the pictogram, straight-line display technique of the present invention to create standalone maps of individual road segments 70, in a pre-printed form that is distributed either singly or as part of a map book. Clearly, these standalone maps for a single road segment 70 may also be printed on demand using a computer printer in conjunction with any of the apparatus of the present invention. The location of the road segment 70 is selected by specifying an address, intersection, latitude and longitude, page number from a map book such as the Thomas Guide™ by Rand McNally, or any other selection means. The possible orientations are then shown, and the user can select which orientation is to be used. Several miles of road, and a plurality of road intersections could be clearly shown in one single road segment 70 map, depending on the detail level selected. Similarly, when presented in pre-printed maps and map books, road segments 70 could be indexed by road name, and maps of each of the roads' relevant segments for the area covered could then be shown in one or in both travel directions.

Figure 21:
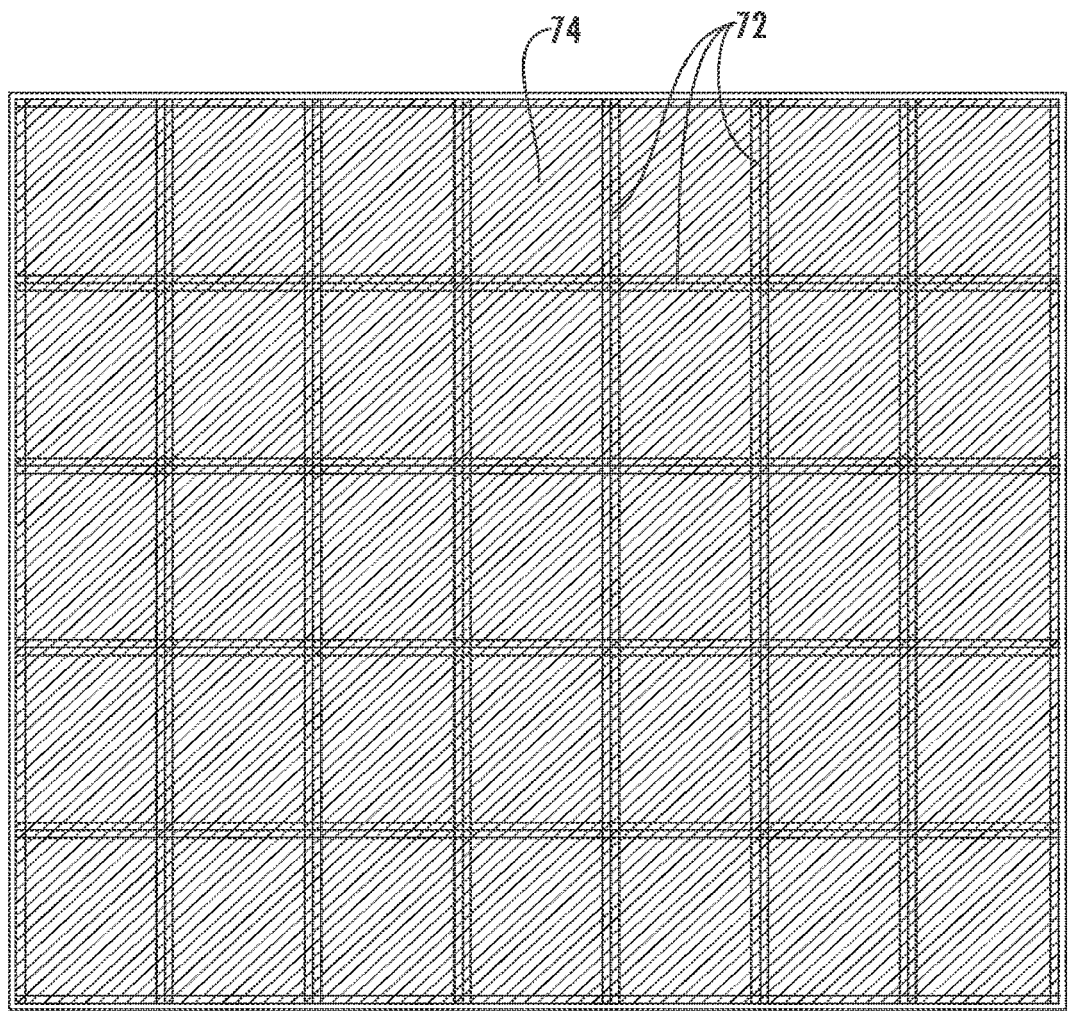
FIG. 21 shows a typical point-arc-polygon map layout with the grid formed by the thick vertical and horizontal lines denoting the roads, and the landmass between the roads denoted by rectangles with a diagonal lines pattern background.
Figure 22:
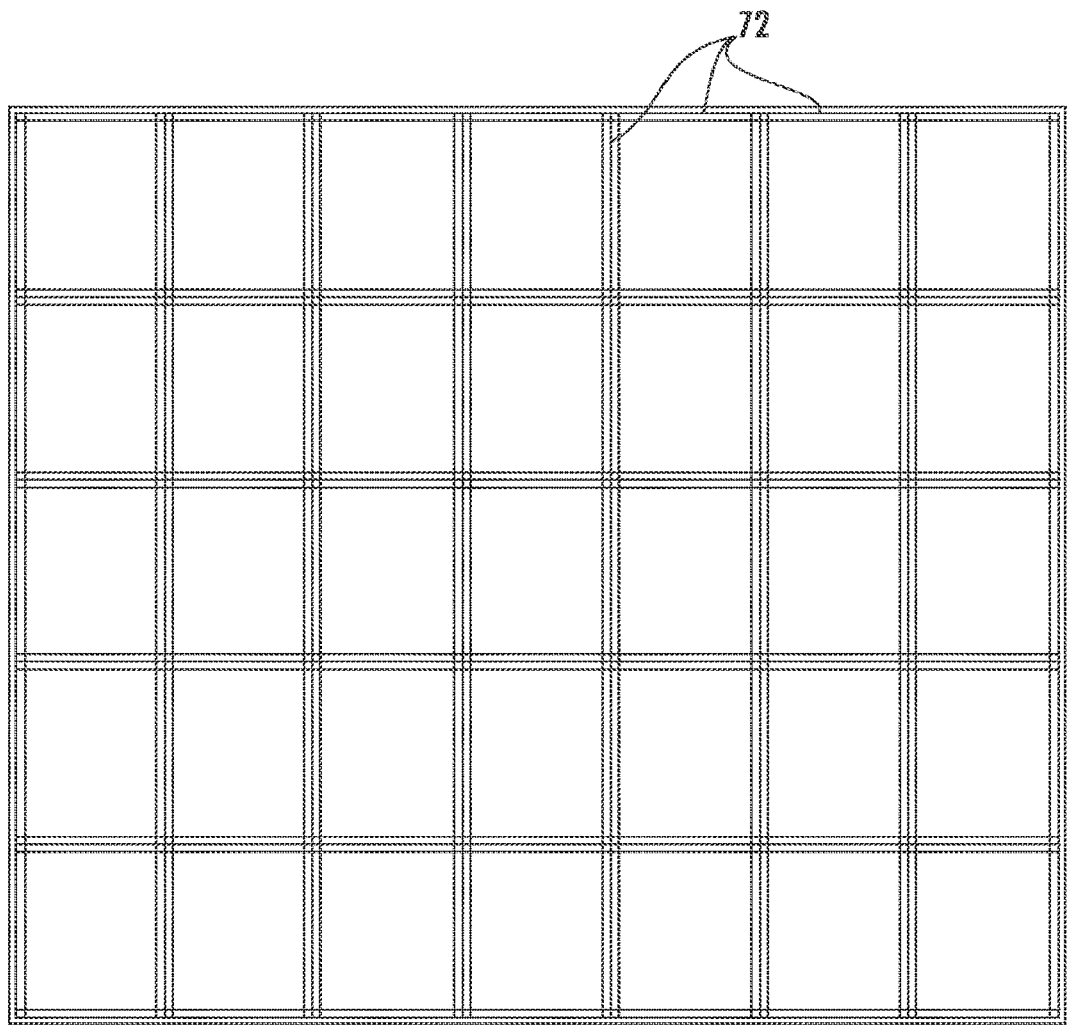
FIG. 22 shows the same point-arc-polygon layout from FIG. 21, but the landmass has been removed and only the roads are left.
Figure 23:
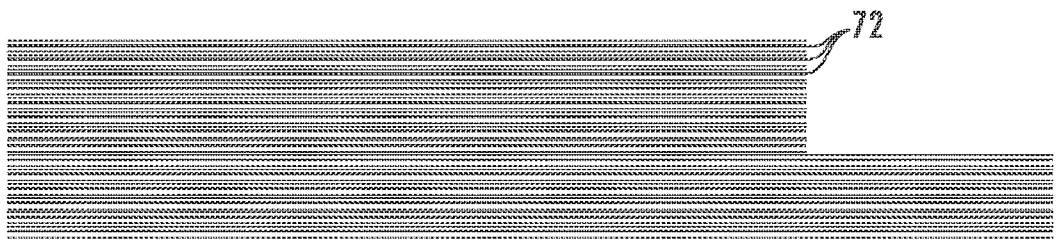
FIG. 23 depicts the roads from FIG. 22 in a compressed manner illustrating a saving in required display and storage space of approximately 80%.
Figure 24:
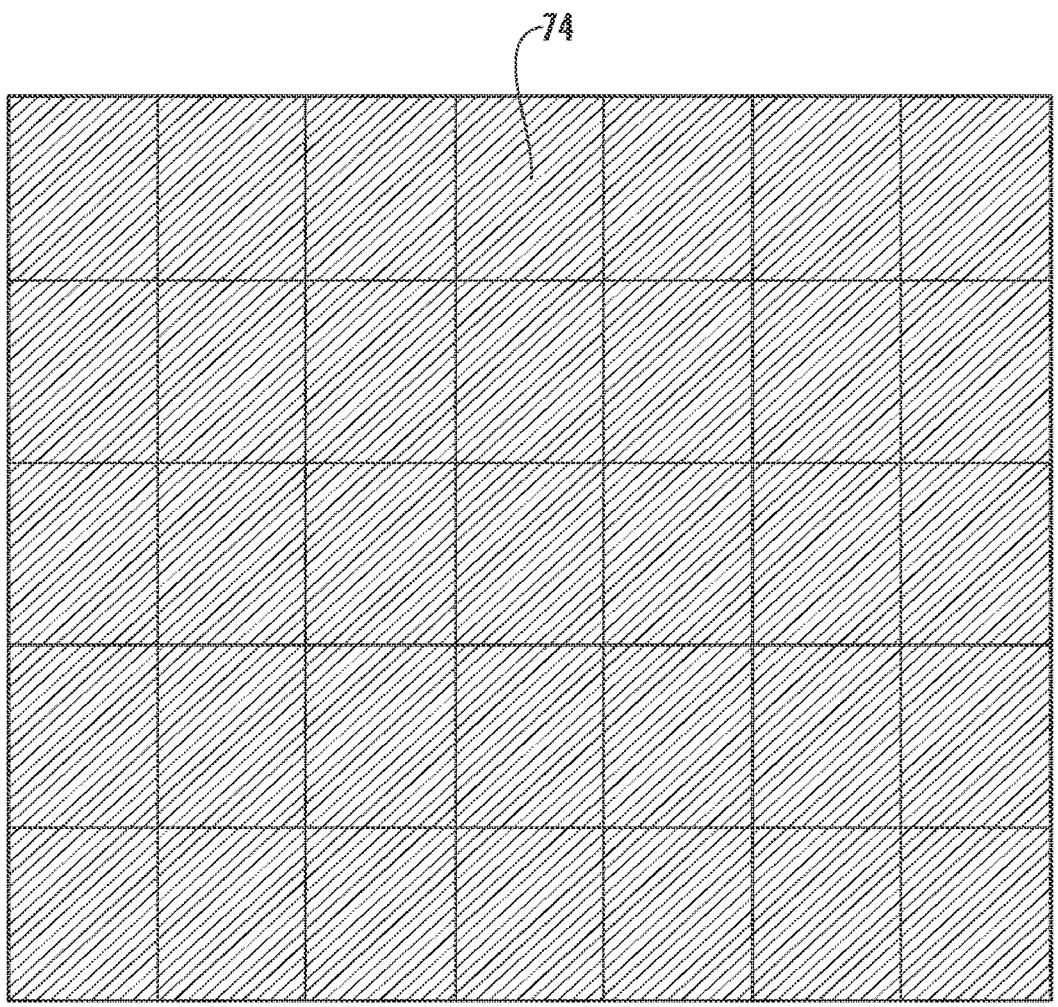
FIG. 24 graphically illustrates the total amount of visual space that was removed from the image surface of the map in FIG. 21 when the landmass was removed.

The storage and display of maps and geographic information in accordance to the present invention's preferred embodiments is greatly enhanced as compared to the prior art. This is the result of depicting road intersections topologically as a combinatorial structure without geometric information and representing the road segments themselves as linear pictograms. The benefits are illustrated in the comparison provided in FIGS. 21-24. FIG. 21 schematically illustrates the space taken up by a typical cartographic map layout with the line grids 72 representing the roads and the landmass 74 represented by the diagonal hatching in the background. FIG. 22 represents the same cartographic layout wherein the relational structure is retained between the roads 72 but the landmass 74 representation has been removed. FIG. 23 in turn represents all of the roadway segments 72 originally depicted in FIGS. 21 and 22 compressed in a manner where they are simply placed side by side in a stacked, compressed format. In this arrangement, the road segments 72 occupy only 20% of the original space required by the original cartographic arrangement. FIG. 24 depicts the amount of landmass 74 space that has been freed up by the present invention as compared to the original cartographic layout. The visual space that has been liberated by the display technique of the present invention can in turn be used for showing many more landmarks, thus making reckoning easier and more accurate. The ability to navigate by landmark features may in fact become critical when GPS capabilities are not present or are non-responsive ("frozen").

Figure 25:
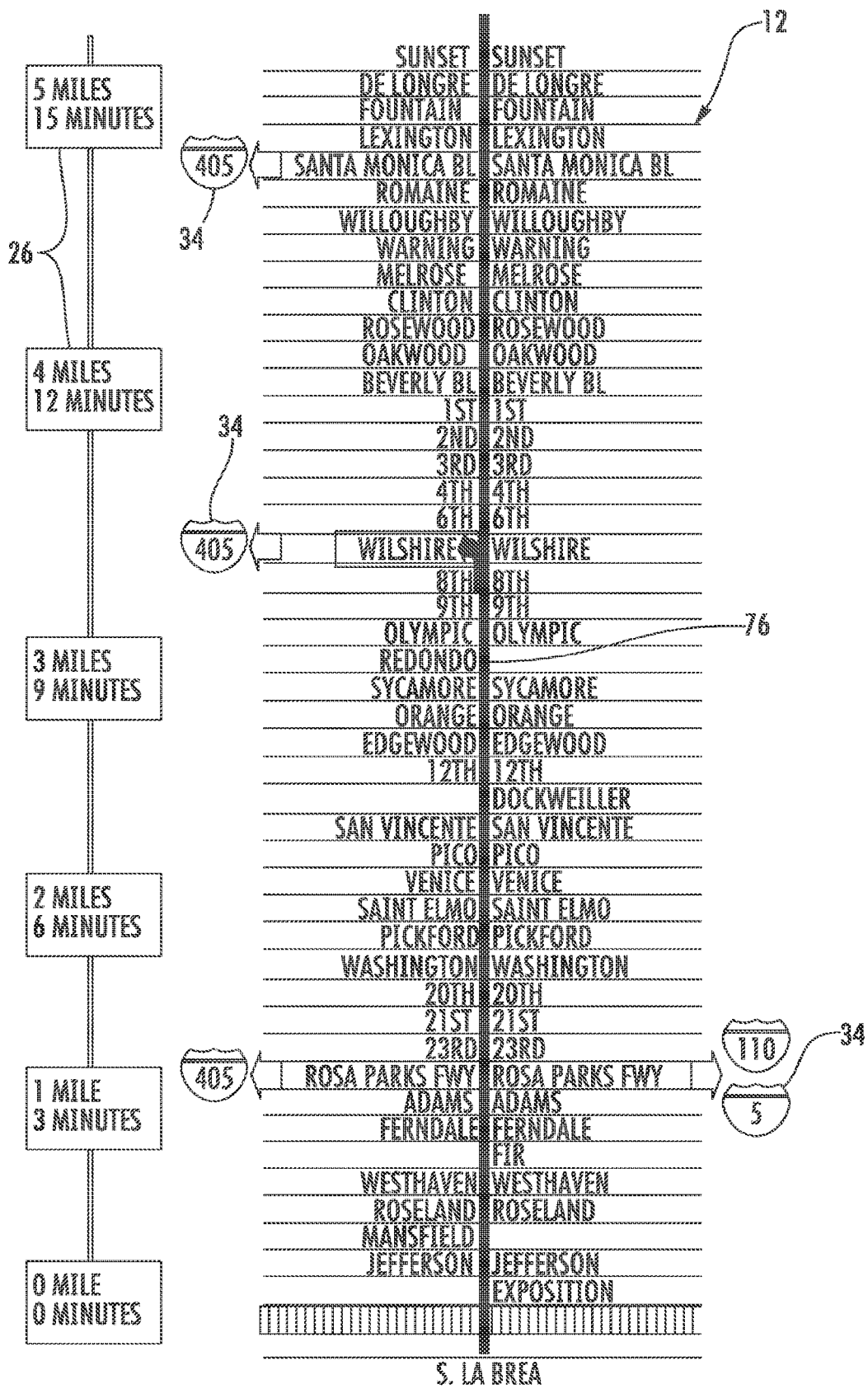
FIG. 25 shows a typical linear-pictogram representation of a road.

In FIG. 25 an alternate embodiment pictogram of the roadway segment 76 is shown. In this embodiment, the roadway 76 is shown as a single line rather than a rendering of the roadway surface. It can be seen, however, that while the roadway segment 76 itself has been depicted in a reduced format, all of the other features of the pictogram display of the present invention remain intact such as the columnar data format, the time and distance estimates 26 and the connecting street information 12.

Figure 26:
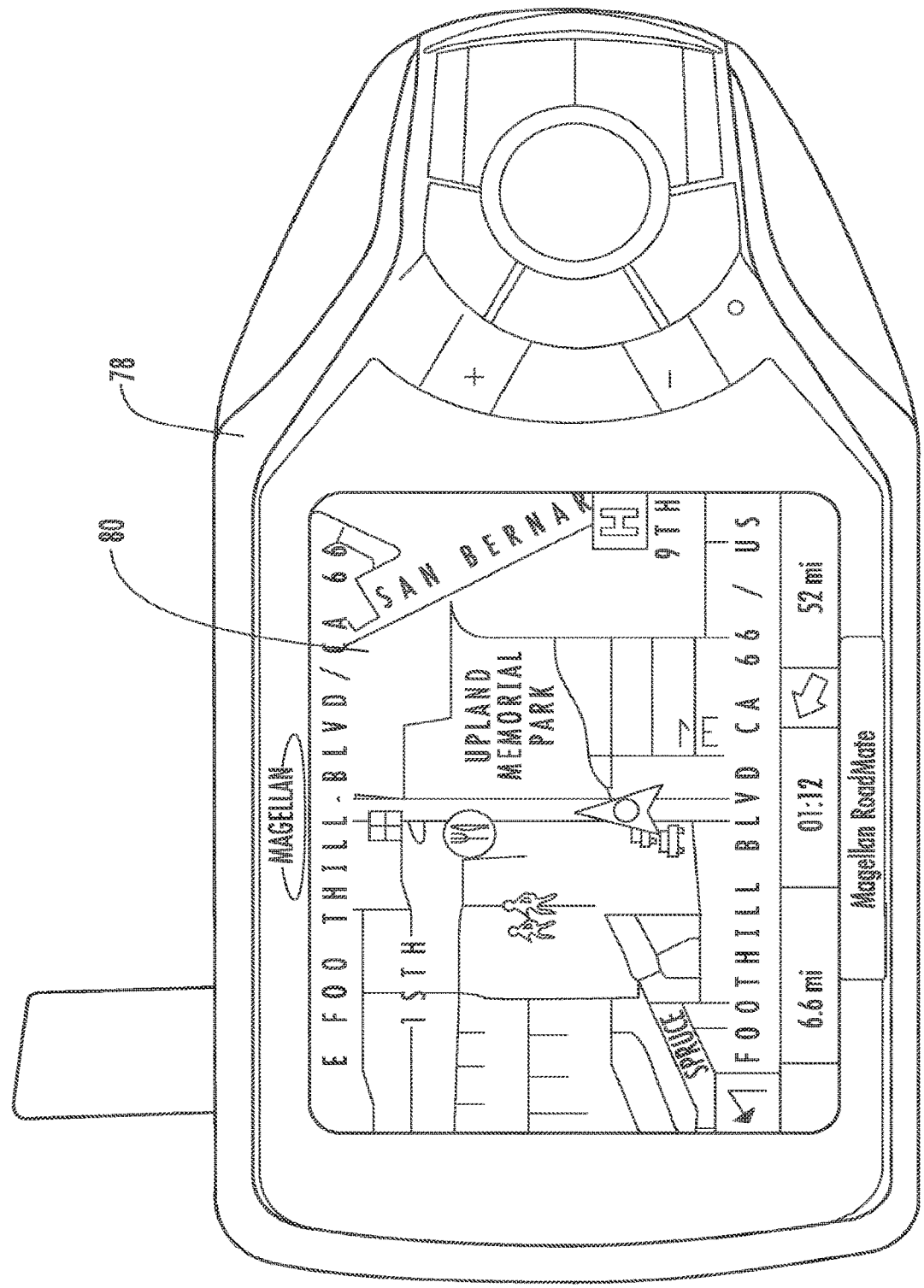
FIG. 26 shows a conventional point-arc-polygon map displayed on a typical portable GPS system.
Figure 27:
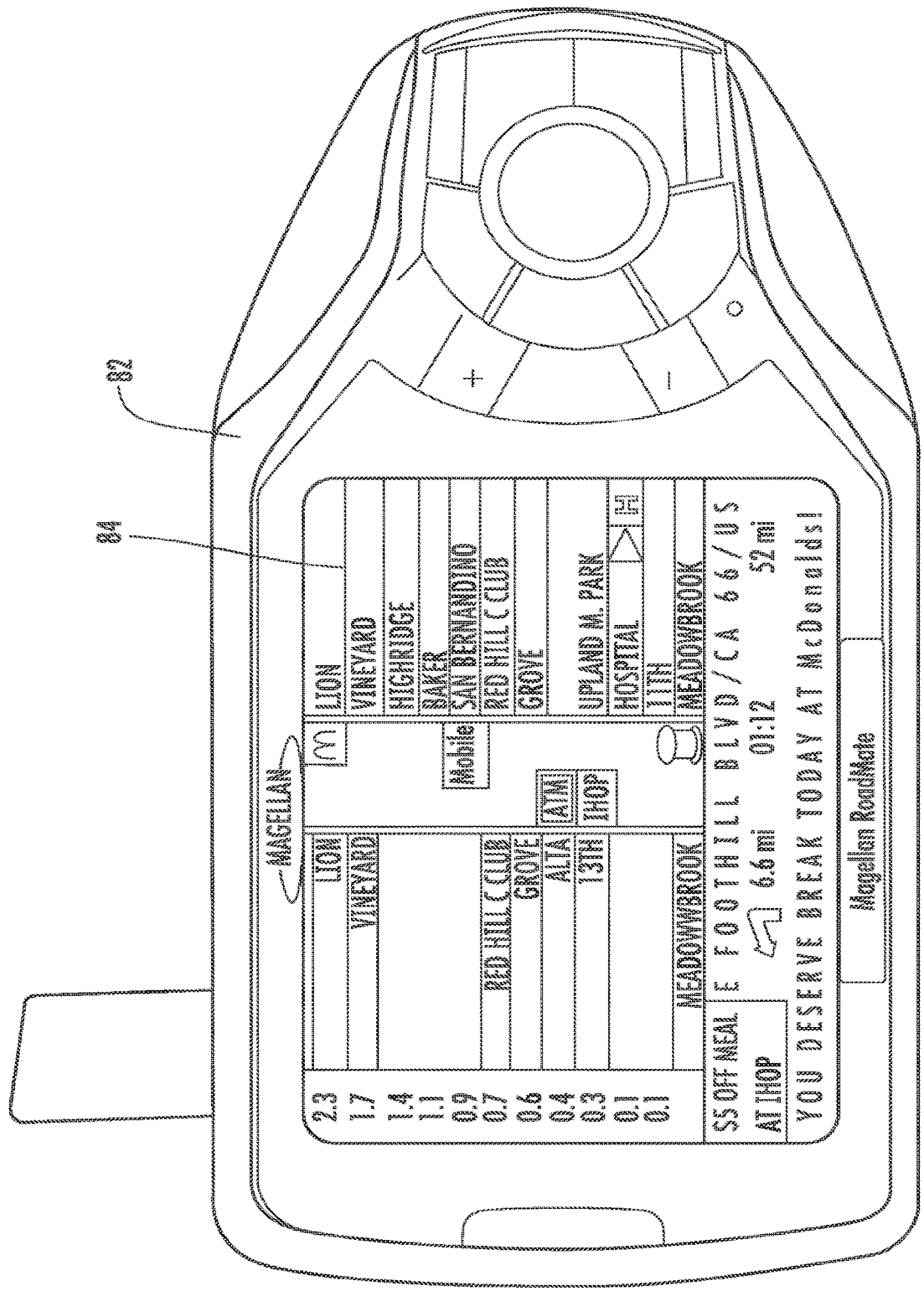
FIG. 27 shows a map in accordance with the present invention displayed on a typical portable GPS system and covering the same location as is depicted in FIG. 26.

For the purpose of illustration, FIGS. 26 and 27 depict respectively a navigational device 78 with a cartographic display 80 and a navigational aid 82 with a pictographic display 84 as it would appear on the same portable GPS system. It is clear that the pictographic display 84 provided by the present invention is clearer and easier for the user to navigate and locate the relevant points of interest. Further, the pictographic display 84 is far less cluttered and easily communicates a large amount of information that simply cannot be obtained by referring to the cartographic display 80.

Comparison of Maps

|  | Cartographic Map | Present Invention |
| --- | --- | --- |
| Number of intersections per view | 1 | 12 |
| Pavement markings are familiar | No | Yes |
| Number of Points of Interest per view | 2 | 5 |
| All text displayed horizontally | No | Yes |
| Directions to hospital shown | No | Yes |
| Total distance per view | 0.3 miles | 2.3 miles |
| Readability | LOW | HIGH |

-continued

|  | Cartographic Map | Present Invention |
| --- | --- | --- |
| Cognitive load | HIGH | LOW |
| Number of advertisements | 0 | 2 |

One skilled in the art can appreciate that the various embodiments herein can include other features that would make the disclosure of the present invention compatible with virtually any available mapping or navigation arrangement known in the prior art. For example, the system may include audio directions that indicate to the driver what the current position is, by stating the road names and/or pavement markings and/or landmarks ahead or previously passed. Additionally, in operation, the system of the present invention may be offered as add-on software, with or without, dedicated peripherals for installation onto existing GPS-enabled devices such as portable or permanently installed standalone GPS systems and GPS-enabled PDAs, mobile telephones such as cellular and satellite telephones, computers (mainframe, desktop, laptop, palmtop, etc.) or Internet-based navigation services such as maps.google.com, www.mapquest.com, www.mappoint.com, and maps.yahoo-.com. (Google, Mapquest, Mappoint and Yahoo are trademarks of their respective owners.)

The method and system of the present invention further serves to provide a user with enhanced directional orientation. While the preferred perspective view of the present invention is a "hovering" view, such as is provided in the all of the figures, other perspective views are possible, such as a "bird's eye" view, where the map is viewed from a position hundreds or thousands of feet above and behind the user. Similarly, buildings and other features that are shown as pictograms on the display may be shown dimensionally to create a 3-D-like appearance.

Also, because of the additional display and printing space made available by the present invention, the locational predictability of the information shown, and other various techniques, the readability, usefulness, and visual appeal of the maps can be enhanced when using preferred embodiments of the present invention. Real-life photographic images could be used instead of icons. Names of intersecting roads can be shown in plain text displayed horizontally (right side up for easy reading in most languages.) and the font size used can be selected such that the map can be readable by most users with average eyesight, on most display monitors and printers. The names of the roads can be incorporated into graphical representations of street signs to enhance user familiarity and for faster visual access. Further, since the relevant intersection and landmark information is being provided in columnar format rather than having to be displayed in conjunction with a cartographic representation, major and/or important intersecting road names can be differentiated and emphasized from the other road names by being shown in larger and/or bold lettering and/or by using a border, and/or by using other such emphasizing techniques. Further, text and graphics colors, effects and shadings may be used in order to highlight, separate, or identify pieces of information in accordance with sound human factors engineering principles.

Another feature that can be more easily communicated to the user as a result of the additional display and printing space the presence of any one or more potentially hazardous road conditions, such as is depicted in FIG. 16. These may include for example: bridges, broken pavement, bumps, construction, curves, dips, falling rocks, foggy areas, heavy trucks, hidden intersections, high wind, ice, narrow roads, pedestrian crossings, railroad crossings, school zones, slippery when wet, steep inclines, stop signs, tire chains required, traffic lights, yield signs as well as many others. Warning signals associated with these hazards could be received by the apparatus of the present invention directly from transmitting devices located at or near the hazard locations.

In addition to providing the functionality describe above, the present apparatus may include a variety of other integrated capabilities as a result of the large amount of free display space that is created. These capabilities may include the integration of information and services provided by companies such as XM™ Satellite Radio Inc. and Pharos™ Science and Applications, Inc. (XM and Pharos are trademarks of their respective owners). Other capabilities including setting a distance and/or time range within which selected points of interest and/or important roads could be shown, providing navigation-assistance information, or users could selecting and/or setting any number of alarms that could give advance notices and/or warnings of destinations, intersections, points of interest, hazards, distances, times, traffic problems, etc. coming up. Similarly, weather information may be provided by organizations such as the U.S. National Weather System (NWS) and other weather broadcasters. Emergency alerts issued by systems such as the Emergency Alert System (EAS) operated by organizations such as the Federal Emergency Management Agency (FEMA) could also be indicated by the system based on the current location. Predictive information such as hotels to be encountered en route between 9 pm and 11 pm, restaurants en route between 11 am and 1 pm, etc. could be provided. One or more news and entertainment devices and services such as radio, television, Internet, and MP3, CD, VCR, DVD, video game, and cassette players and other such devices and services could be incorporated into embodiments of the present invention. The present invention could provide information to assist geocaching users. For applicable embodiments of the present invention, the user may chose to display and/or print previously-captured images, such as images of roads, intersections, storefronts, monuments, mountains, and other points of interest and features located on or nearby the current road segment being shown. Sources and means for retrieving these images include local data storage; WiFi, EDGE and other mobile wireless data services; real-time and archived transmissions from roadside cameras, satellites, helicopters, airplanes, balloons, etc; and downloads from the Internet. The system could include a camera to record one or more images during a trip, and optionally time-stamp and/or location-stamp such image or images, with or without manual intervention by the users. Optionally, the users would be able to record additional information related to the image or images recorded by the system. The system could record images and index them to the route locations where the images were captured. At any time after the recording is made, users could select locations on the route's map and view, store, or transmit the images. Some of the embodiments of the present invention could automatically send or receive emails, facsimiles, SMS, and other types of text, images, and audio messages based on criteria specified by the user. Embodiments of the present invention equipped with wireless transmission capabilities could enable users to carry out telephonic communications. Various Location-Based Services (LBS) could access embodiments of the present invention, or be accessed by them, so that points of interest, such as the ATM (Automated Teller Machine) closest to the current location could be located. Reservations for restaurants, movies, theater, sporting events, tours, and to other locations and events could be made by the system. Purchases of products and services from establishments shown on the system could be made through the system. Embodiments of the present invention could deliver news, games, and entertainment programs based on the current location. Embodiments of the present invention could locate video and other game-players based on the current location, and/or could make the current location known to video and other game-players. Embodiments of the present invention, when in a user-specified or pre-set proximity to landmarks such as stores, monuments, historical places, and tourist attractions, can have the landmark names, descriptions, images, history, address, operating hours, merchandise for sale, admission prices, and other such information mapcast to the user. Embodiments of the present invention can interface with Microsoft Outlook or other such organizing systems, enabling the users to send and receive emails, calendar items, contact information and notes, and to synchronize with the organizing systems.

Some or all of the geographic information, points of interest, commercial establishments, freeway exits, and other data and attributes data used by maps, devices and services provided according to the present invention may be obtained from sources such as commercial suppliers of mapping data, such as Navteq Corporation, Tele Atlas North America Inc., Rand McNally & Company, and Zenrin USA, Governments, such as the U.S. Government, advertisers, operators of points of interest such as restaurants, automotive service stations, amusement parks, and hotels. The data used by the present invention may be downloaded using standard communication methods such as hard-wired telephone transmissions, cable television services, wireless transmissions, direct cables, or computer media. Some or all of the data used by the present invention may be converted, interpolated or extrapolated from third party databases. Some or all of the data used by the present invention may be created from scratch for the present invention. The data file(s) used by the present invention may be compressed in order to accommodate small-form devices such as portable GPS systems, PDAs, Pocket PCs, satellite telephones, and cellular telephones.

Getting from one destination to another ("routing") is performed similar to the current operation of computer, Internet and GPS-based systems. However, as a result of having more visual space available, more routing choices can be made available. The routing capabilities needed by the present invention can be provided by third party routing software providers. Similarly, the present invention could do its own route-calculations. Preferably, the routing software used by the present invention could be developed specifically for it by using standard programming languages and known mathematical algorithms. The present invention could offer alternate route choices, depending on preference selections, including: suggested route, shortest route, fastest route, scenic route, least fuel consumption route, avoid congested roads, avoid expressways, avoid toll roads, avoid ferries, avoid specific roads, avoid specific towns, avoid tunnels, avoid bridges, avoid heights or avoid left turns. Further, one or more waypoints may be allowed. One or more start and destination points may be stored in memory for easier selection at a later time. Route guidance may be suspended at any time. More than one route may be set at any one time. Any of the routes set may be simulated, i.e. the user may go through the route step-by-step without actually traveling on the route.

It can therefore be seen that the present invention provides a novel paradigm for mapping and creating navigational aids. In particular, the present invention provides a method and system for depicting roadway segments in a linear pictographic manner that provides predictable locations for relevant information while liberating a large amount of visual space for the conveyance of mapping information in a neat and organized fashion. In this manner, the method and system of the present invention provide a pictographic mapping representation that reduces the stress and cognitive load imposed on a user of the device. For these reasons, the instant invention is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

The embodiments of the invention in which an exclusive property or privilege is claimed are defined as follows:

1. A mapping apparatus comprising a processor and a storage medium, the processor configured to:
   generate a non-scaled and compressed view of roads on a display device based at least in part on mapping data and position data, the non-scaled and compressed view of roads depicting roads as vertical linear pictograms and arranged so that a view representative of a current travel road and upcoming roads relative to a current geographic location of the apparatus is displayed in an expected order of encounter and indications of intersecting roads are arranged as a compressed list in a column layout with descriptive features grouped together by type and displayed in columns irrespective of actual distance between intersections; and
   update said non-scaled and compressed view.

2. The mapping apparatus of claim 1, wherein said non-scaled and compressed view of said roads depicts representations of said roads as straight lines with no landmass features or scaling.

3. The mapping apparatus of claim 2, wherein said non-scaled and compressed view includes information related to features adjacent to said roads and information related to actual distance and estimated time required to travel to various locations along said roads, said information displayed in columnar format adjacent to said representations of said roads.

4. The mapping apparatus of claim 2, wherein said non-scaled and compressed view includes icons representing points of interest, said icons being positioned along said representations of said roads and positioned in a non-scaled relative order of encounter.

5. The mapping apparatus of claim 1, further configured to receive signals and determine the current geographic location of said mapping apparatus.

6. The mapping apparatus of claim 1, wherein said non-scaled and compressed view includes said current travel road and intersecting roads perpendicular to said current travel road, wherein said non-scaled and compressed view includes a plurality of icons representing points of interest, said icons being positioned on said current travel road and said intersecting roads in a non-scaled relative order of encounter.

7. The mapping apparatus of claim 1, wherein said non-scaled and compressed view includes a central map area including said current travel road and intersecting roads perpendicular to said current travel road, and a plurality of icons representing points of interest on said current travel road and said intersecting roads in a non-scaled relative order of encounter, said non-scaled and compressed view further including a peripheral information area outside said central map area, said peripheral information area including a plurality of icons representing points of interest within a predetermined distance of the central map area but not located on roads depicted within said central map area.

8. The mapping apparatus of claim 7, wherein said icons in said peripheral information area are grouped into icon clouds based on their general geographic direction from the central map area.

9. The mapping apparatus of claim 1, wherein said non-scaled and compressed view is updated in response to changes in said position data or a determined direction of travel.

10. A computer-implemented method comprising, by a processor:
generating a non-scaled and compressed view of roads on a display device based, at least in part, on mapping data and position data, the non-scaled and compressed view of roads depicting roads as vertical linear pictograms and arranged so that a view representative of a current travel road and upcoming roads relative to a current geographic location is displayed in an expected order of encounter and indications of intersecting roads are arranged as a compressed list in a column layout with descriptive features grouped together by type and displayed in columns irrespective of actual distance between intersections; and
updating said non-scaled and compressed view.

11. The method of claim 10, wherein said non-scaled and compressed view of said roads depicts representations of said roads as straight lines with no landmass features or scaling.

12. The method of claim 11, wherein said non-scaled and compressed view includes information related to features adjacent to said roads and information related to actual distance and estimated time required to travel to various locations along said roads, said information displayed in columnar format adjacent to said representations of said roads.

13. The method of claim 11, wherein said non-scaled and compressed view includes icons representing points of interest, said icons being positioned along said representations of said roads and positioned in a non-scaled relative order of encounter.

14. The method of claim 10, further comprising determining the current geographic location.

15. The method of claim 10, wherein said non-scaled and compressed view includes said current travel road and intersecting roads perpendicular to said current travel road, and wherein said non-scaled and compressed view includes a plurality of icons representing points of interest, said icons being positioned on said current travel road and said intersecting roads in a non-scaled relative order of encounter.

16. The method of claim 10, wherein said non-scaled and compressed view includes a central map area including said current travel road and intersecting roads perpendicular to said current travel road, and a plurality of icons representing points of interest on said current travel road and said intersecting roads in a non-scaled relative order of encounter, said non-scaled and compressed view further including a peripheral information area outside said central map area, said peripheral information area including a plurality of icons representing points of interest within a predetermined distance of the central map area but not located on roads depicted within said central map area.

17. The method of claim 16, wherein said icons in said peripheral information area are grouped into icon clouds based on their general geographic direction from the central map area.

18. The method of claim 10, wherein said non-scaled and compressed view is updated in response to changes in said position data or a determined direction of travel.

19. A computer-readable storage medium having stored thereon computer-readable instructions configured to, when executed by a processor, cause the processor to, at least:
generate a non-scaled and compressed view of roads on a display device based at least in part on mapping data and position data, the non-scaled and compressed view of roads depicting roads as vertical linear pictograms and arranged so that a view representative of a current travel road and upcoming roads relative to a current geographic location is displayed in an expected order of encounter and indications of intersecting roads are arranged as a compressed list in a column layout with descriptive features grouped together by type and displayed in columns irrespective of actual distance between intersections; and
update said non-scaled and compressed view.

20. The computer-readable storage medium of claim 19, wherein said non-scaled and compressed view of said roads depicts representations of said roads as straight lines with no landmass features or scaling.

21. The computer-readable storage medium of claim 20, wherein said non-scaled and compressed view includes information related to features adjacent to said roads and information related to actual distance and estimated time required to travel to various locations along said roads, said information displayed in columnar format adjacent to said representations of said roads.

22. The computer-readable storage medium of claim 20, wherein said non-scaled and compressed view includes icons representing points of interest, said icons being positioned along said representations of said roads and positioned in a non-scaled relative order of encounter.

23. The computer-readable storage medium of claim 19, wherein the computer-readable instructions are further configured to, when executed by the processor, cause the processor to determine the current geographic location.

24. The computer-readable storage medium of claim 19, wherein said non-scaled and compressed view includes said current travel road and intersecting roads perpendicular to said current travel road, and wherein said non-scaled and compressed view includes a plurality of icons representing points of interest, said icons being positioned on said current travel road and said intersecting roads in a non-scaled relative order of encounter.

25. The computer-readable storage medium of claim 19, wherein said non-scaled and compressed view includes a central map area including said current travel road and intersecting roads perpendicular to said current travel road, and a plurality of icons representing points of interest on said current travel road and said intersecting roads in a non-scaled relative order of encounter, said non-scaled and compressed view further including a peripheral information area outside said central map area, said peripheral information area including a plurality of icons representing points of interest within a predetermined distance of the central map area but not located on roads depicted within said central map area.

26. The computer-readable storage medium of claim 25, wherein said icons in said peripheral information area are grouped into icon clouds based on their general geographic direction from the central map area.

27. The computer-readable storage medium of claim 21, wherein said non-scaled and compressed view is updated in response to changes in said position data or a determined direction of travel.

* * * * *